(12) United States Patent
Tarchala et al.

(10) Patent No.: US 11,703,988 B1
(45) Date of Patent: Jul. 18, 2023

(54) SOCIAL INTERACTION BASED DISPLAY CONTROL

(71) Applicant: Honda Motor Co., Ltd., Tokyo (JP)

(72) Inventors: Christopher John Tarchala, Torrance, CA (US); Hanna Gee, Torrance, CA (US); Macarena Rojas Bustamante, Torrance, CA (US); Matthew B. Staal, Torrance, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/538,096

(22) Filed: Nov. 30, 2021

Related U.S. Application Data

(60) Provisional application No. 63/159,911, filed on Mar. 11, 2021.

(51) Int. Cl.
*G06F 15/173* (2006.01)
*G06F 3/0481* (2022.01)
*G06Q 50/00* (2012.01)
*H04L 67/306* (2022.01)

(52) U.S. Cl.
CPC ........... *G06F 3/0481* (2013.01); *G06Q 50/01* (2013.01); *H04L 67/306* (2013.01)

(58) Field of Classification Search
None
See application file for complete search history.

(56) References Cited

U.S. PATENT DOCUMENTS

| 8,571,580 | B2 | 10/2013 | Altman et al. |
| 8,989,778 | B2 | 3/2015 | Altman et al. |
| 9,608,956 | B2 | 3/2017 | Sawato |
| 2014/0059139 | A1* | 2/2014 | Filev ...................... G06Q 10/10 709/205 |
| 2017/0205246 | A1* | 7/2017 | Koenig .................. B60K 35/00 |
| 2019/0289367 | A1* | 9/2019 | Siddiq .................. H04N 21/485 |
| 2021/0287459 | A1* | 9/2021 | Cella ..................... G07C 5/0808 |

FOREIGN PATENT DOCUMENTS

| CN | 102984192 B | 4/2017 |
| CN | 108712360 A | 10/2018 |
| IN | 201821035523 A | 1/2020 |
| WO | 2010006062 A1 | 1/2010 |
| WO | 2018068160 A1 | 4/2018 |
| WO | 2018187880 A1 | 10/2018 |

\* cited by examiner

*Primary Examiner* — Wing F Chan
*Assistant Examiner* — Andrew Woo
(74) *Attorney, Agent, or Firm* — Suzanne Gagnon; American Honda Motor Co., Inc.

(57) ABSTRACT

A server and method for social interaction-based display control is provided. The server acquires information associated with a first user of an electronic device. The server determines social connections of the first user based on the acquired information. The server analyzes an interaction of the first user with second users based on a communication between the second users and the first user. The second users may be associated with the social connections. The server determines, based on the analyzed interaction a connection score indicating a degree of interaction between the second users and the first user. The server transmits display information indicating the determined connection score to the electronic device. The electronic device may adjust display characteristics of a user interface (UI) element associated with the second users based on the display information.

20 Claims, 11 Drawing Sheets

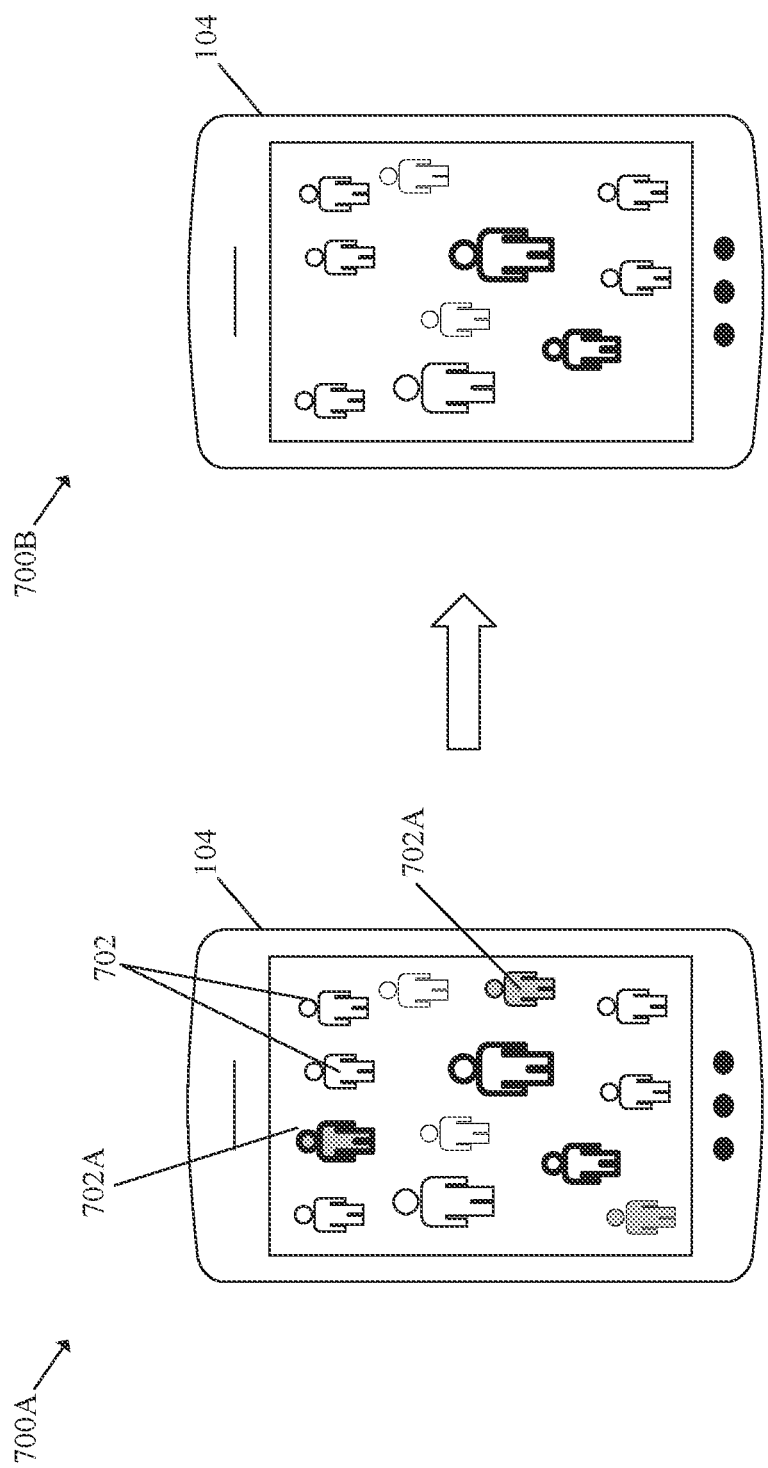

SOCIAL INTERACTION BASED DISPLAY CONTROL

CROSS-REFERENCE TO RELATED APPLICATIONS

This application claims priority to U.S. Provisional Patent Application Ser. No. 63/159,911 filed on Mar. 11, 2021 and titled system and method for providing information pertaining to a personal vehicle, which is hereby incorporated by reference in its entirety.

BACKGROUND

Advancements in computer technology have led to development of various techniques to enhance social interaction among people. For example, users may share and/or exchange personalized information through various websites or software applications (such as social media applications). Generally, a user digitally interacts with another user by adding the user as a social connection and exchanging messages or other information with the user. Typically, social media websites provide a static view of social connections. The static view can typically be a list view or a grid view of thumbnails with some text that lets the user explore the profile of connections in the social network and check the timeline of posts or messages exchanged with connections. As social connections grow, the static view may limit user's ability to interact with new or old connections as the user may have to spend some time to search or scroll through a long list of connections. Over time, this may affect the scope of new user interactions with connections, especially ones with whom the interaction is already less.

Limitations and disadvantages of conventional and traditional approaches will become apparent to one of skill in the art, through comparison of described systems with some aspects of the present disclosure, as set forth in the remainder of the present application and with reference to the drawings.

SUMMARY

According to an embodiment of the disclosure, a server for social interaction-based display control is provided. The server may acquire information associated with a first user of a first electronic device and may determine one or more social connections of the first user based on the acquired information associated with the first user. The server may analyze an interaction of the first user with each of one or more second users based on a communication between the one or more second users and the first user. The one or more second users may be associated with the one or more social connections of the first user. The server may determine, based on analyzed information, a connection score indicating a degree of interaction between each of the one or more second users and the first user. The server may transmit display information indicative of the determined connection score to the first electronic device associated with the first user. The first electronic device may adjust one or more display characteristics of a user interface (UI) element associated with each of the one or more second users based on the display information.

According to an embodiment of the disclosure, a first electronic device for social interaction-based display control is provided. The first electronic device may acquire information associated with a first user of the first electronic device and may determine one or more social connections of the first user based on the acquired information associated with the first user. The first electronic device may analyze an interaction of the first user with each of one or more second users based on a communication between the one or more second users and the first user. The one or more second users may be associated with the one or more social connections of the first user. The first electronic device may determine, based on the analyzed interaction, a connection score indicating a degree of interaction between each of the one or more second users and the first user. The first electronic device may control a display screen associated with the first electronic device to adjust one or more display characteristics of a user interface (UI) element associated with each of the one or more second users based on the determined connection score.

According to another embodiment of the disclosure, a method associated with a server is provided. The method may include acquiring information associated with a first user of a first electronic device. The method may further include determining one or more social connections of the first user based on the acquired information associated with the first user. The method may further include analyzing an interaction of the first user with each of one or more second users based on a communication between the one or more second users and the first user. The one or more second users may be associated with the one or more social connections of the first user. The method may further include determining, based on the analyzed interaction, a connection score indicating a degree of interaction between each of the one or more second users and the first user. The method may further include transmitting display information indicating the determined connection score to the first electronic device associated with the first user. The first electronic device may adjust one or more display characteristics of a user interface (UI) element associated with each of the one or more second users based on the display information.

BRIEF DESCRIPTION OF THE DRAWINGS

FIGS. 7A and 7B collectively illustrate an exemplary scenario to update display information for one or more second users based on information about an emotional state or a driving pattern, in accordance with an embodiment of the disclosure.

DETAILED DESCRIPTION

Various embodiments of the present disclosure may be found in a server for social interaction-based display control. The server may be configured to acquire information (such as information pertaining to network connections via a software application) associated with a first user of a first electronic device (for example, a smartphone, a smartwatch, and the like). Based on the acquired information associated with the first user, the server may be configured to determine one or more social connections (such as friends, family members, colleagues, and acquaintances) of the first user. Thereafter, the server may be configured to analyze an interaction of the first user with each of one or more second users based on a communication (such as messages shared, media content shared, comments posted, or posts liked) between the one or more second users and the first user. The one or more second users may be associated with the one or more social connections of the first user.

Based on the analyzed interaction, the server may be configured to determine a connection score between each of the one or more second users and the first user. The connection score may indicate a degree of interaction between each of the one or more second users and the first user. Thereafter, the server may be configured to transmit display information indicating the determined connection score to the first electronic device associated with the first user. Based on the display information, the first electronic device may adjust display characteristics of a user interface (UI) element associated with each of the one or more second users. Examples of the display characteristics of the UI element may include, but are not limited to a size, a color, a highlighting, an animation, an image, a background, or a display position. For example, first electronic device may adjust a size or a display position of the UI element, based on the display information. The adjustments of the display characteristics may enable the user to view his/her current or past social interactions and status of the users included or not in the social connections and to initiate, join, or resume an interaction with users. The adjusted UI elements not only help the user to have a better engagement/interaction with other users but may also provide an improved user experience with application(s) that display such UI element(s) on the first electronic device.

Figure 1:
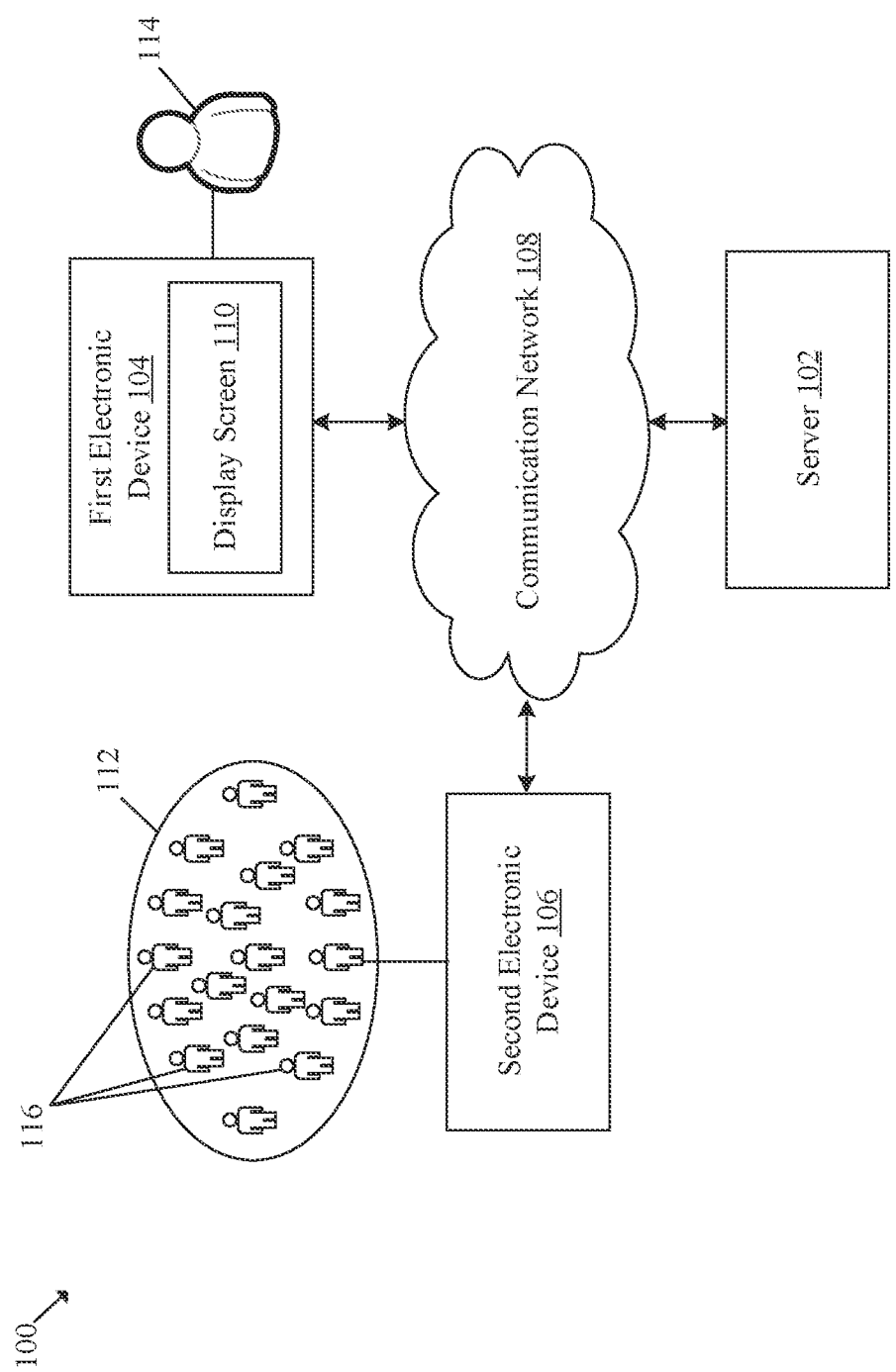
FIG. 1 is a block diagram that illustrates an exemplary network environment for social interaction-based display control, in accordance with an embodiment of the disclosure.

FIG. 1 is a block diagram that illustrates an exemplary network environment for social interaction-based display control, in accordance with an embodiment of the disclosure. With reference to FIG. 1, there is shown a block diagram of a network environment 100. The network environment 100 may include a server 102, a first electronic device 104, and a second electronic device 106. The server 102, the first electronic device 104, and the second electronic device 106 may be communicatively coupled via a communication network 108. The first electronic device 104 may include a display screen 110. There is further shown a first user 114 associated with the first electronic device 104 and one or more second users 116 associated with respective electronic devices (such as the second electronic device 106).

The server 102 may include suitable logic, circuitry, interfaces, and/or code that may be configured to transmit display information to the first electronic device 104. The display information may include a connection score that may indicate a degree of interaction between each of the one or more second users 116 and the first user 114. The display information may be transmitted to the first electronic device 104 so as to adjust display characteristics of a user interface (UI) element associated with each of the one or more second users 116. The UI element associated with each of the one or more second users 116 may be displayed on the display screen 110 of the first electronic device 104.

In an embodiment, the server 102 may be implemented as a cloud server and may execute operations through web applications, cloud applications, HTTP requests, repository operations, file transfer, and the like. Other example implementations of the server 102 may include, but are not limited to, a database server, a file server, a content server, a web server, an application server, a mainframe server, or a cloud computing server.

In at least one embodiment, the server 102 may be implemented as a plurality of distributed cloud-based resources by use of several technologies that are well known to those ordinarily skilled in the art. A person with ordinary skill in the art will understand that the scope of the disclosure may not be limited to the implementation of the server 102 and the first electronic device 104 as two separate entities. In certain embodiments, the functionalities of the server 102 can be incorporated in its entirety or at least partially in the first electronic device 104, without a departure from the scope of the disclosure.

The first electronic device 104 may include suitable logic, circuitry, code, and/or interfaces that may be configured to control the display screen 110 to display the user interface (UI) element associated each of the one or more second users 116. By way of example, and not limitation, for each user, the respective UI element may be a two-dimensional (2D) avatar, a three-dimensional (3D) avatar, or a human-character graphic that represents the respective user on a 2D/3D UI (such as a map UI). The UI element may be displayed based on display characteristics, such as but not limited to, a display position on the display screen 110, a size of the UI element on the display screen 110, and a weight or thickness of an edge portion of the UI element, Examples of the first electronic device 104 may include, but are not limited to, a smartphone, a mobile phone, a tablet, a laptop, a gaming device, a handheld device, a head-mounted display (such as an eXtended Reality (XR) display or a helmet with a Head-up Display (HUD) or an integrated display panel), or a wearable computer (such as a smart watch).

The display screen 110 may include suitable logic, circuitry, and/or interfaces that may be configured to display media or other information generated by the first electronic device 104 and the server 102. For example, the display screen 110 may be utilized to display the user interface (UI) element associated with each of the one or more second users 116. In an embodiment, the display screen 110 may be externally coupled with the first electronic device 104, through an I/O interface or a network interface. In another embodiment, the display screen 110 may be integrated into the first electronic device 104.

In at least one embodiments, the display screen 110 may be a touch screen which may enable the first user 114 to provide a user input via the display screen 110. The display screen 110 may be realized through several known technologies such as, but not limited to, a Liquid Crystal Display (LCD) display, a Light Emitting Diode (LED) display, a plasma display, or an Organic LED (OLED) display, or other display technologies. In accordance with an embodiment, the display screen 110 may refer to a display screen of a head mounted device (HMD), a smart-glass device, a see-through display, a projection-based display, an electro-chromic display, or a transparent display.

The second electronic device 106 may include suitable logic, circuitry, code, and/or interfaces that may be configured to transmit information to the server 102. The transmitted information may be associated with each of the one or more second users 116. The transmitted information may include, but not limited to, information associated with interaction of the first user 114 with each of one or more second users 116, information about one or more products owned by the second user 116, or one or more social connections of the second user 116. Examples of the second electronic device 106 may include, but are not limited to, a smartphone, a mobile phone, a tablet, a laptop, a gaming device, a handheld device, a head-mounted display (such as an eXtended Reality (XR) display or a helmet with a Head-up Display (HUD) or an integrated display panel), or a wearable computer (such as a smart watch).

The communication network 108 may include a communication medium through which the server 102, the first electronic device 104, and the second electronic device 106 may communicate with one another. Examples of the communication network 108 may include, but are not limited to, the Internet, a cloud network, a Wireless Local Area Network (WLAN), a Wireless Fidelity (Wi-Fi) network, a Personal Area Network (PAN), a Local Area Network (LAN), a telephone line (POTS), and/or a Metropolitan Area Network (MAN), a mobile wireless network, such as a Long-Term Evolution (LTE) network (for example, 4th Generation or 5th Generation (5G) mobile network (i.e., 5G New Radio)). Various devices in the network environment 100 may be configured to connect to the communication network 108, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), ZigBee, EDGE, IEEE 802.11, light fidelity (Li-Fi), 802.16, IEEE 802.11s, IEEE 802.11g, multi-hop communication, wireless access point (AP), device to device communication, cellular communication protocols, or Bluetooth (BT) communication protocols, or a combination thereof.

In operation, the server 102 may be configured to receive a user input to activate a social interaction mode. In such a mode, the server 102 may be configured to perform a set operations to adjust display characteristics of the UI element associated with each of the one or more second users. A description of such operations is provided herein.

At any time-instant, the server 102 may be configured to acquire information associated with the first user 114 of the first electronic device 104. Based on the acquired information associated with the first user 114, the server 102 may be configured to determine the one or more social connections of the first user 114. As an example, the one or more social connections of the first user 114 may include at least one of a friend, a family member, or an acquaintance of the first user 114.

In an embodiment, the server 102 may be configured to receive information associated with a geographical region 112 from the first electronic device 104. Specifically, the geographical region 112 may include, but not limited to, a current geolocation of the first user 114 or a geolocation preferred by the first user 114. For example, the first electronic device 104 may be configured to receive, using the display screen 110, a user input indicative of the information associated with the geographical region 112. The user input may specify a country, a state, a city, a province, or a zip code. In some embodiments, the server 102 may transmit a map to the first electronic device 104. The map may be displayed on the display screen 110 associated with the first electronic device 104. Thereafter, the first electronic device 104 may receive a user input on the map (via the I/O device (of FIG. 9) associated with the first electronic device 104). For example, the user input may include, but not limited to, a touch input on the displayed map or a shape (such as a circle, a rectangle, an ellipse, or any other shape) drawn over the displayed map to indicate the geographical region 112. The server 102 may be configured to determine the one or more social connections of the first user 114 based on the received information associated with the geographical region 112.

In some embodiments, the first electronic device 104 may include location sensor (not shown), to acquire the information associated with the geographical region 112. The location sensor may include logic, circuitry, code and/or interfaces that may be configured to acquire the information associated with the geographical region 112 of first electronic device 104. The first electronic device 104 may be configured to transmit the acquired information to the server 102. Thereafter, the server 102 may be configured to determine the one or more social connections of the first user 114 based on the acquired information. Examples of the location sensor may include, but are not limited to, a Global Navigation Satellite System (GNSS)-based sensor and a mobile positioning system (such as a system that uses LTE positioning protocol).

The server 102 may be configured to analyze an interaction of the first user 114 with each of the one or more second users 116 based on a communication between the one or more second users 116 and the first user 114. The one or more second users 116 may be associated with the one or more social connections of the first user 114. In certain instances, the one or more second users 116 may be included in the one or more social connections of the first user 114 and/or may be associated with the geographical region 112. Details related to the analysis of the interaction of the first user 114 with each of the one or more second users 116 are provided, for example, in FIG. 3.

In some embodiments, the first user 114 and the one or more second users 116 may be owner of one or more products and may use at least one software application associated with such products. In some instances, the first user 114 and the one or more second users 116 may or may not be owners of a similar type of product. For example, the first user 114 may be owner of a product A (such as a vehicle) sold by a company X and the second user may be owner of a product B (such as an infotainment system) sold by the company X. The second user and the first user 114 may use a software application associated with such products. The second user may be included in the one or more social connections of the first user 114 and may belong to the geographical region 112. In some instances, the server 102 may be configured to analyze an interaction of the first user 114 with the second user based on a communication between the second user and the first user 114 on at least one software application associated with the one or more products.

In an embodiment, the first electronic device 104 may control the display screen 110 to display a UI. The UI may include a UI element associated with each user of the one or more second users 116. The UI element may be a 2D character graphic that is shown at a particular location on the display screen 110. Each UI element may be associated with display characteristics, such as, but not limited to, a size, a color, a color highlight, an animation effect, an image, a background, and an on-screen display position.

The server 102 may be configured to determine a connection score associated with each of the one or more second users 116 and the first user 114 based on the analyzed interaction. The connection score may indicate a degree of interaction between each of the one or more second users 116 and the first user 114. By way of example, and not limitation, the degree of interaction may correspond to a frequency of the interaction (such as sharing of one or more messages) between each of the one or more second users 116 and the first user 114. In some instances, the degree of interaction may indicate a strength of relationship between each of the one or more second users 116 and the first user 114. Details related to the determination of the connection score are provided, for example, in FIG. 3. Thereafter, the server 102 may be configured to transmit display information indicating the determined connection score to the first electronic device 104 associated with the first user 114. Details related to the transmission of the display information are provided, for example, in FIG. 3.

The first electronic device 104 may receive the display information and may adjust display characteristics of a UI element associated with each of the one or more second users 116, based on the received display information. In an embodiment, the display characteristics of the UI element may be adjusted suitably based on the determined connection score indicated by the display information. For example, the UI element may correspond to a 2D/3D character graphic or an avatar of a second user associated with the one or more social connections of the first user 114. If the second user has a strong relationship with the first user 114 and a high connection score (based on the analyzed interaction), then the display characteristics of the UI element associated with the second user may be adjusted to accommodate the determined connection score. For instance, the UI element for the second user may be made larger in size as compared to the UI elements for remaining users. Also, the UI element for the second user may be positioned at the center of the display screen 110 to indicate a high degree of interaction and a strong relationship with the first user 114.

Figure 2:
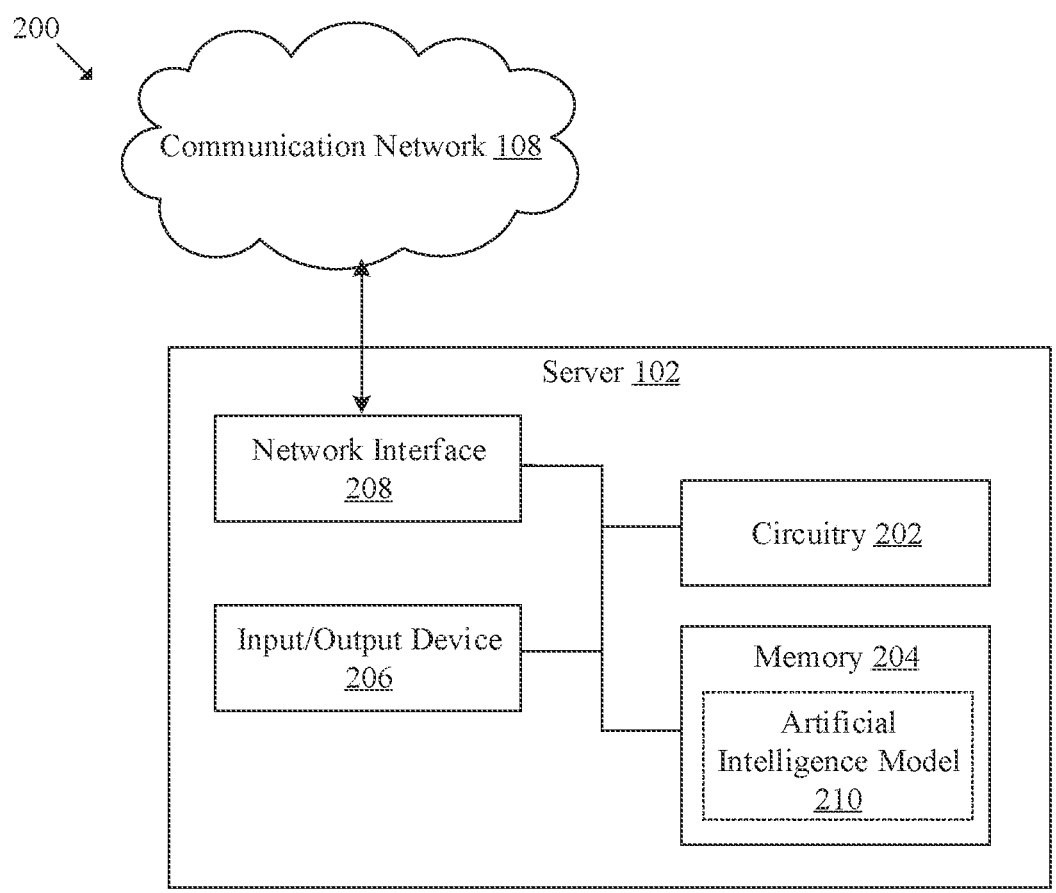
FIG. 2 is a block diagram that illustrates an exemplary server of FIG. 1, in accordance with an embodiment of the disclosure.

FIG. 2 is a block diagram that illustrates an exemplary server of FIG. 1, in accordance with an embodiment of the disclosure. FIG. 2 is explained in conjunction with elements from FIG. 1. With reference to FIG. 2, there is shown a block diagram 200 of the server 102. The server 102 may include circuitry 202, a memory 204, an Input/Output (I/O) device 206, and a network interface 208. The memory 204 may include an artificial intelligence (AI) model 210. The network interface 208 may connect the server 102 with the first electronic device 104, via the communication network 108.

The circuitry 202 may include suitable logic, circuitry, interfaces, and/or code that may be configured to execute program instructions associated with different operations to be executed by the server 102. The circuitry 202 may include one or more specialized processing units, which may be implemented as a separate processor. In an embodiment, the one or more specialized processing units may be implemented as an integrated processor or a cluster of processors that may be configured to perform the functions of the one or more specialized processing units, collectively. The circuitry 202 may be implemented based on a number of processor technologies that are known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may include suitable logic, circuitry, interfaces, and/or code that may be configured to store program instructions to be executed by the circuitry 202. The memory 204 may be configured to store the AI model 210. The memory 204 may be configured to store a user profile associated with the second user. In an embodiment, the memory 204 may store the connection score associated with each of the one or more second users 116 and the first user 114. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The AI model 210 may be trained on a task to analyze the interaction of the first user 114 with each of one or more second users 116 to determine a connection score between each of the one or more second users 116 and the first user 114. For example, the AI model 210 may be trained to analyze the communication between the one or more second users 116 and the first user 114.

In an embodiment, the AI model 210 may be implemented as a deep learning model. The deep learning model may be defined by its hyper-parameters and topology/architecture. For example, the deep learning model may be a deep neural network-based model that may have a number of nodes (or neurons), activation function(s), number of weights, a cost function, a regularization function, an input size, a learning rate, number of layers, and the like. Such a model may be referred to as a computational network or a system of nodes (for example, artificial neurons). For a deep learning implementation, the nodes of the deep learning model may be arranged in layers, as defined in a neural network topology. The layers may include an input layer, one or more hidden layers, and an output layer. Each layer may include one or more nodes (or artificial neurons, represented by circles, for example). Outputs of all nodes in the input layer may be coupled to at least one node of hidden layer(s). Similarly, inputs of each hidden layer may be coupled to outputs of at least one node in other layers of the model. Outputs of each hidden layer may be coupled to inputs of at least one node in other layers of the deep learning model. Node(s) in the final layer may receive inputs from at least one hidden layer to output a result. The number of layers and the number of nodes in each layer may be determined from the hyper-parameters, which may be set before, while, or after training the deep learning model on a training dataset.

Each node of the deep learning model may correspond to a mathematical function (e.g., a sigmoid function or a rectified linear unit) with a set of parameters, tunable during training of the model. The set of parameters may include, for example, a weight parameter, a regularization parameter, and the like. Each node may use the mathematical function to compute an output based on one or more inputs from nodes in other layer(s) (e.g., previous layer(s)) of the deep learning model. All or some of the nodes of the deep learning model may correspond to same or a different mathematical function.

In training of the deep learning model, one or more parameters of each node may be updated based on whether an output of the final layer for a given input (from the training dataset) matches a correct result based on a loss function for the deep learning model. The above process may be repeated for same or a different input till a minima of loss function is achieved, and a training error is minimized. Several methods for training are known in the art, for example, gradient descent, stochastic gradient descent, batch gradient descent, gradient boost, meta-heuristics, and the like.

In an embodiment, the AI model 210 may include electronic data, which may be implemented as, for example, a software component of an application executable on the server 102. The AI model 210 may include code and routines that may be configured to enable a computing device, such as the server 102 to perform one or more operations for generation of captions. Additionally, or alternatively, the AI model 210 may be implemented using hardware including, but not limited to, a processor, a microprocessor (e.g., to perform or control performance of one or more operations), a field-programmable gate array (FPGA), a co-processor (such as an AI-accelerator), or an application-specific integrated circuit (ASIC). In some embodiments, the trained AI model 210 may be implemented using a combination of both hardware and software.

In certain embodiments, the AI model 210 may be based on a hybrid architecture of multiple Deep Neural Networks (DNNs). Examples of the AI model 210 may include, but are not limited to, a neural network model or a model based on one or more of regression method(s), instance-based method(s), regularization method(s), decision tree method(s), Bayesian method(s), clustering method(s), association rule learning, and dimensionality reduction method(s). Examples of the AI model 210 may include a neural network model, but are not limited to, an artificial neural network (ANN), a deep neural network (DNN), a convolutional neural network (CNN), a recurrent neural network (RNN), a CNN-recurrent neural network (CNN-RNN), R-CNN, Fast R-CNN, Faster R-CNN, a Residual Neural Network (Res-Net), a Feature Pyramid Network (FPN), a Retina-Net, a Single Shot Detector (SSD), and/or a combination thereof.

The I/O device 206 may include suitable logic, circuitry, interfaces, and/or code that may be configured to receive an input and provide an output based on the received input. The I/O device 206 may include various input and output devices, which may be configured to communicate with the circuitry 202. In an example, the server 102 may receive (via the I/O device 206) the user input indicative of the geographical region 112. The server 102 may control the I/O device 206 to output the display characteristics of a user interface (UI) element for each of the one or more second users 116. Examples of the I/O device 206 may include, but are not limited to, a touch screen, a keyboard, a mouse, a joystick, a display device, a microphone, or a speaker.

The network interface 208 may include suitable logic, circuitry, interfaces, and/or code that may be configured to facilitate communication between the server 102, and the first electronic device 104, via the communication network 108. The network interface 208 may be implemented by use of various known technologies to support wired or wireless communication of the server 102 with the communication network 108. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 208 may be configured to communicate via a wired communication or a wireless communication or a combination thereof with networks, such as the Internet, an Intranet, a wireless network, a cellular telephone network, a wireless local area network (LAN), or a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The operations of the circuitry 202 are further described, for example, in FIGS. 3, 4A, 4B, 4C, 5, 6A, 6B, 7A, and 7B. It may be noted that the server 102 shown in FIG. 2 may include various other components or systems. The description of the other components or systems of the server 102 has been omitted from the disclosure for the sake of brevity.

Figure 3:
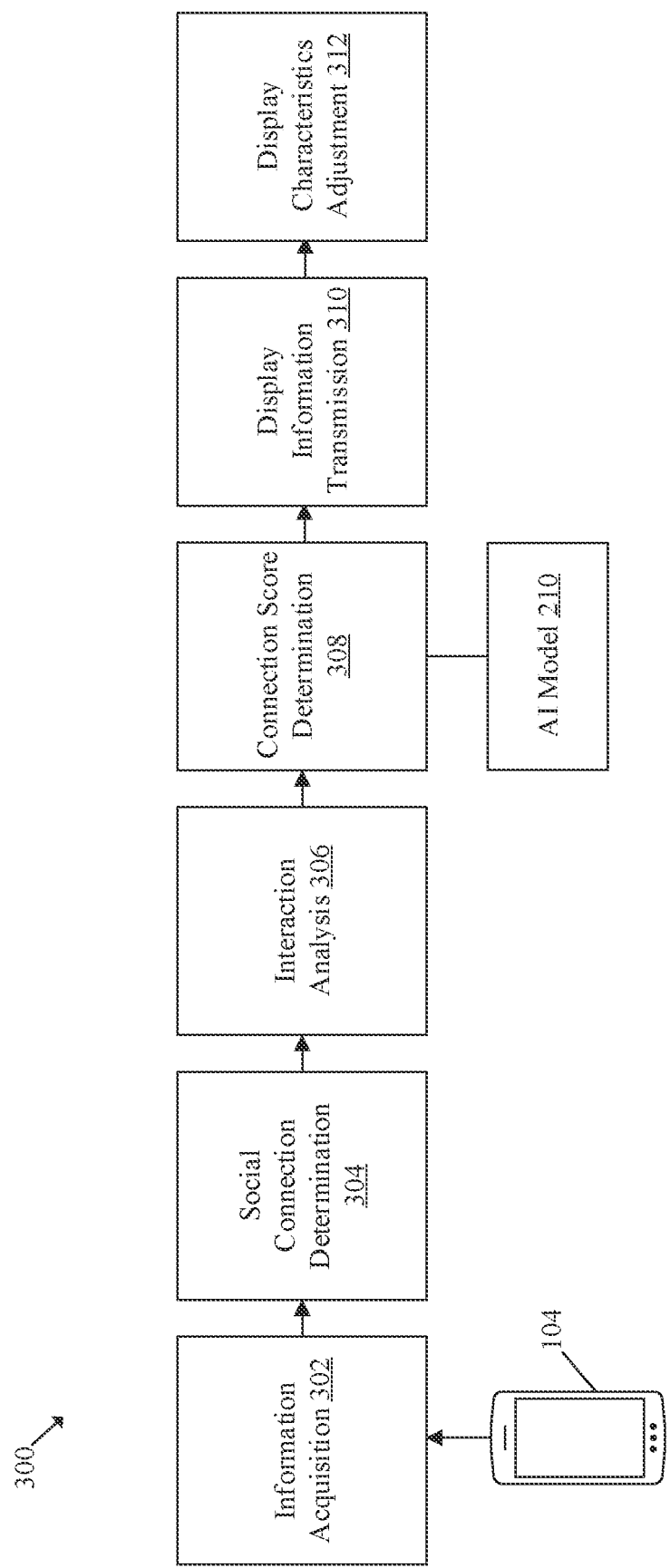
FIG. 3 is a diagram that illustrates an exemplary processing pipeline for social interaction-based display control, in accordance with an embodiment of the disclosure.

FIG. 3 is a diagram that illustrates an exemplary processing pipeline for social interaction-based display control, in accordance with an embodiment of the disclosure. FIG. 3 is explained in conjunction with elements from FIGS. 1 and 2. With reference to FIG. 3, there is shown an exemplary processing pipeline 300 that illustrates exemplary operations from 302 to 310. The exemplary operations may be executed by any computing system, for example, by the server 102 of FIG. 1 or by the circuitry 202 of FIG. 2.

At 302, information may be acquired. In an embodiment, the circuitry 202 may be configured to acquire information associated with a first user (such as the first user 114) of the first electronic device 104. The information may be acquired from one or more sensors (not shown) associated with the first electronic device 104. Additionally, or alternatively, the information may be acquired from a data source other than the one or more sensors. The data source may include, for example, a memory (not shown) associated with the first electronic device 104, a cloud server, a social media website, an API (i.e., Application Programming Interface), a data aggregator, and the like.

The information may be indicative of data pertaining to social connections of the first user 114. As shown, for example, the information may be acquired by the first electronic device 104 (for example, a smartphone). The acquired information may include, for example, one or more social connections of the first user 114, a geographical location of the first user 114, message information associated with the first user 114, media content information associated with the first user 114, and the like. The message information associated with the first user 114 may include the communication between the one or more second users 116 and the first user 114. Examples of the communication may include, but are not limited to, one or more messages shared and a number of the one or more messages. The media content information associated with the first user 114 may include one or more media content shared with the one or more second users 116.

At 304, social connections may be determined. In an embodiment, the circuitry 202 may be configured to determine one or more social connections of the first user 114 based on the acquired information associated with the first user 114. By way of example, and not limitation, the one or more social connections may include friends, family members, or acquaintances of the first user 114. The one or more social connections of the first user 114 may be acquired through a web client or a software application installed or accessible on the first electronic device 104.

At 306, interactions may be analyzed. In an embodiment, the circuitry 202 may be configured to analyze an interaction of the first user 114 with each of one or more second users 116 based on a communication between the one or more second users 116 and the first user 114. The one or more second users 116 may be associated with the one or more social connections of the first user 114. By way of example, and not limitation, the one or more second users 116 may correspond to friends, family members, or acquaintances of the first user 114 and may be included in the one or more social connections.

In an embodiment, the circuitry 202 may be configured to receive the communication between each of the one or more second users 116 and the first user 114 from the one or more sensors associated with the first electronic device 104. For example, the interaction of the first user 114 with each of the one or more second users 116 may correspond to a communication through the web client or the software application installed or accessible on the first electronic device 104. Examples of the communication between the one or more second users 116 and the first user 114 may include, but are not limited to, one or more messages shared, a frequency of the one or more messages, one or more media content shared, a number of the one or more messages, or a number of likes or dislikes for the one or more messages. The one or more messages may include a video message, an audio message, a text message, or a multimedia message shared between the first user 114 and each of the one or more second users 116.

The frequency of the one or more messages may be indicative of a degree of interaction between each of the one or more second users 116 and the first user 114 and may specify a rate at which one or more messages may be shared between each of the one or more second users 116 and the first user 114. By way of example, and not limitation, the frequency of the one or more messages may be 1, 10, 50, 100 or any other numeric value within a period.

The one or more media content may correspond to any digital data that can be rendered, streamed, broadcasted, and stored on any electronic device or storage. Examples of the media content may include, but are not limited to, images (such as overlay graphics), animations (such as 2D/3D animations or motion graphics), audio/video data, or Internet content (e.g., streaming media, downloadable media, Webcasts, and the like). The number of messages may correspond to a total number of the one or more messages shared between the first user 114 and each of the one or more second users 116 over a period. For example, the number of the one or more messages may be 1, 5, 100, or 1000 in a week. The number of likes or dislikes for the one or more messages may correspond to a total number of positive or negative reactions/sentiments for the one or more messages.

The server 102 may be configured to analyze the communication between the first user 114 and each of one or more second users 116 using natural language processing (NLP) techniques. For example, the server 102 may employ NLP techniques to extract text information (such as keywords or key phrases) from text messages (i.e., the communication) shared between the first user 114 and the one or more second users 116. The text information may include information to determine whether an interaction between the first user 114 and each of the one or more second users 116 is a positive interaction or a negative interaction. For example, if the text information includes positive keywords or key phrases that may be indicative of a friendly or helpful interaction, then the interaction between the first user 114 and each of the one or more second users 116 may be determined as a positive interaction. Similarly, if the text information includes negative keywords (e.g., with a negative sentiment) or key phrases that may be indicative of a rude or poor interaction, then the interaction between the first user 114 and each of the one or more second users 116 is determined as a negative interaction. Examples of the NLP techniques associated with analysis of text may include, but are not limited to, an automatic summarization, a sentiment analysis, a context extraction, a parts-of-speech tagging, a semantic relationship extraction, a stemming, a text mining, and a machine translation. The detailed implementation of the aforementioned NLP techniques may be known to one skilled in the art, and therefore, a detailed description for the aforementioned NLP techniques has been omitted from the disclosure for the sake of brevity.

At 308, a connection score may be determined. In an embodiment, the circuitry 202 may be configured to determine, based on the analyzed interaction, the connection score indicating a degree of interaction between each of the one or more second users 116 and the first user 114. The degree of interaction in the communication between each of the one or more second users 116 and the first user 114 may be indicative of a frequency of the communication between each of the one or more second users 116 and the first user 114. The connection score may be measured as a percent value between 0% and 100% or a value between 0 to 1. A higher connection score may denote a higher degree of interaction in the communication between each of the one or more second users 116 and the first user 114. Similarly, a lower connection score may denote a lower degree of interaction in the communication between each of the one or more second users 116 and the first user 114.

In an embodiment, the circuitry 202 may be configured to determine the connection score based on application of the stored AI model 210 on the communication between the first user 114 and each of the one or more second users 116. The AI model 210 may receive the communication between the first user 114 and each of the one or more second users 116 as input and may detect the degree of interaction in the communication. Further, the AI model 210 may analyze the communication between the first user 114 and each of the one or more second users 116. Based on analysis, the AI model 210 may determine an interaction as a positive or negative interaction.

In an embodiment, the communication between the first user 114 and each of the one or more second users 116 may be analyzed using one or more NLP techniques to determine the connection score. For example, a connection score associated with a second user of the one or more second users 116 and the first user 114 may be 100%, this may indicate a high degree of positive interaction with a close connection (for example, a best friend or a spouse). In another example, a connection score associated with a second user of the one or more second users 116 and the first user 114 may be 40%, this may indicate an average or a moderate degree of positive or negative interaction with a connection (for example, a neighbor or a colleague).

At 310, display information may be transmitted. In an embodiment, the circuitry 202 may be configured to transmit display information indicating the determined connection score to the first electronic device 104 associated with the first user 114.

At 312, display characteristics may be adjusted. In an embodiment, the first electronic device 104 may adjust one or more display characteristics of a user interface (UI) element associated with each of the one or more second users, based on the display information. Examples of the display characteristics of the UI element for each of the one or more second users may include, but not limited to a size, a color, a highlighting, an animation, an image, a background, or a display position. Details of the display characteristics of the UI element for each of the one or more second users are described, for example, in FIGS. 4A, 4B, and 4C.

Figure 4A:
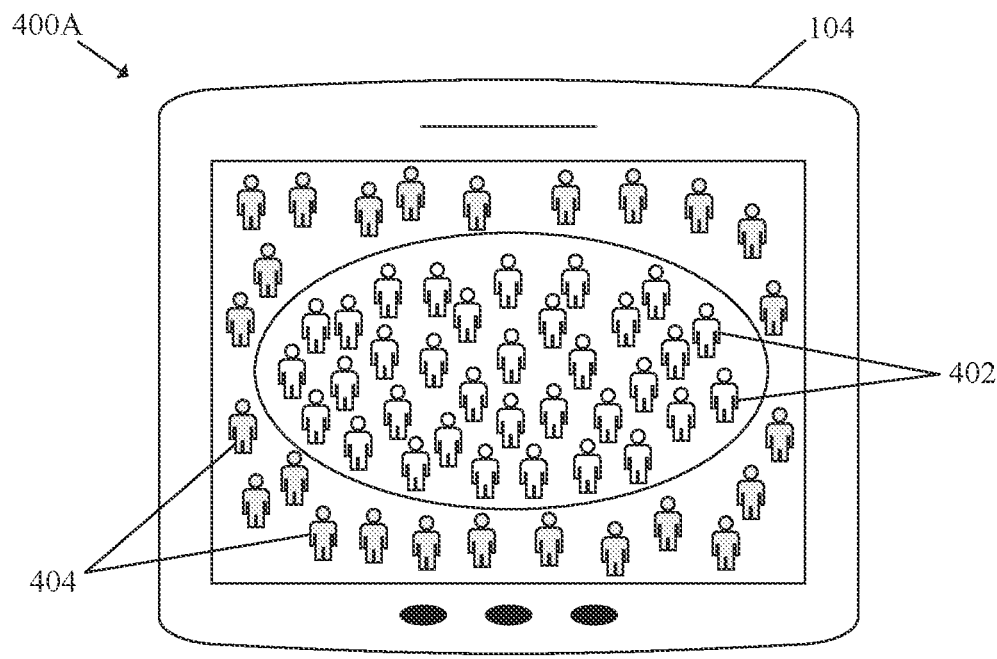
FIGS. 4A, 4B, and 4C are diagrams that illustrate exemplary scenarios to control display characteristics of a user interface (UI) element associated with each of the one or more second users, in accordance with an embodiment of the disclosure.

FIG. 4A is a diagram that illustrates an exemplary scenario to control display characteristics of a user interface (UI) element associated with each of the one or more second users, in accordance with an embodiment of the disclosure. FIG. 4A is explained in conjunction with elements from FIGS. 1, 2, and 3. With reference to FIG. 4A, there is shown a diagram 400A of an exemplary scenario. In the scenario, there is shown the first electronic device 104, first user interface (UI) elements 402, and second UI elements 404.

The first electronic device 104 may control the display screen 110 to display a UI. The UI may be an application interface, such as a user interface of a smartphone application that may be configured to display UI elements associated with one or more second users and one or more third users, who may be different from the one or more second users. While the one or more second users may be associated with the one or more social connections of the first user 114, the one or more third users may not be included in the one or more social connections of the first user 114. An example of the user interface may include a graphical user interface (GUI) of an application software that may be installed on the first electronic device 104 or may be accessible via a web client of the first electronic device 104. The application software may receive or send data from various sources, such as sensors or a computer included within the first electronic device 104, a server, social media, and/or a third-party aggregators.

Each of the first UI elements 402 may be associated with a respective second user of the one or more second users and each of the second UI elements 404 associated with a respective third user of the one or more third users. The first UI elements 402 and the second UI elements 404 may be configured to display animations or avatars of the one or more second users and the one or more third users.

In some scenarios, the display information may indicate that the connection score between each of the one or more third users and the first user 114 is zero. The first electronic device 104 may adjust the display characteristics of the second UI elements 404 (associated with respective third users) based on the display information. For example, the adjustment may include a change in color of the second UI elements 404 to grey from a default color based on the connection score indicated through the display information.

In an embodiment, the circuitry 202 may be configured to receive information associated with interaction(s) between the first user 114 and the one or more third users. By way of example, and not limitation, the received information may include information associated with one or more events attended or organized by the first user 114 and/or each of the one or more third users and/or any other communication between the first user 114 and the one or more third users. Examples of the communication may include, but are not limited to, one or more messages shared, a frequency of the one or more messages, one or more media content shared, a number of the one or more messages, or a number of likes or dislikes for the one or more messages.

The circuitry 202 may be configured to analyze the received information associated with the interaction between the first user 114 and the one or more third users. In some instances, the one or more third users may not be included in the one or more social connections of the first user 114. The circuitry 202 may be configured to analyze the received information to determine one or more common events attended or organized by the first user 114 and each of the one or more third users. Further, the received information may be analyzed to determine a degree of interaction between the first user 114 and the one or more third users. The analysis of the received information may be similar to the analysis of the interaction between the first user 114 and each of one or more second users 116. The details of the analysis of the interaction of the first user 114 with each of one or more second users 116 are described, for example, at 306 in FIG. 3.

Based on the analyzed interaction between the first user 114 and the one or more third users, the circuitry 202 may be configured to determine a connection score indicating a degree of interaction between each of the one or more third users and the first user 114. Further, based on the determined connection score, the circuitry 202 may be configured to generate recommendations to update the one or more social connections of the first user 114. For example, the recommendations may include addition of the one or more third users to the one or more social connections of with the first user 114. In some instances, if a third user of the one or more third users has a high connection score, then the circuitry 202 may be configured to transmit a recommendation to the first electronic device to add the third user as the social connection. This may help the first user 114 to expand his/her social network.

The circuitry 202 may be configured to transmit the display information to the first electronic device 104. The first electronic device 104 may adjust the one or more display characteristics of the second UI elements 404 associated with the respective third user.

Figure 4B:
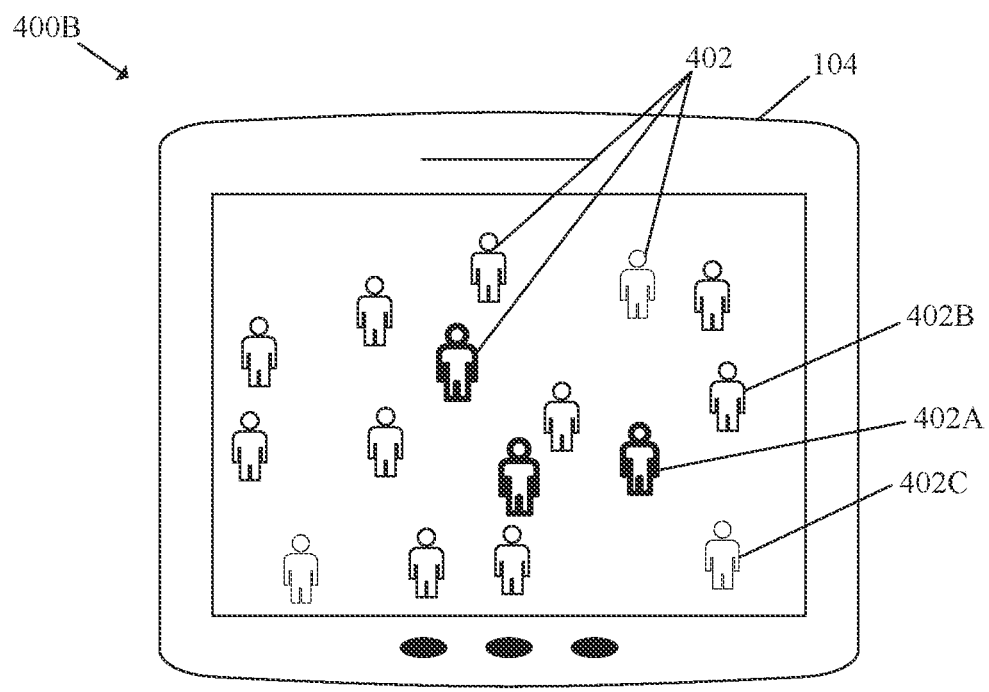

FIG. 4B is a diagram that illustrates an exemplary scenario to control display characteristics of a user interface (UI) element associated with each of one or more second users, in accordance with an embodiment of the disclosure. FIG. 4B is explained in conjunction with elements from FIGS. 1, 2, 3, and 4A. With reference to FIG. 4B, there is shown a diagram 400B of an exemplary scenario. In the scenario, there is shown the first electronic device 104 and the first UI elements 402 associated with the one or more social connections of the first user 114.

Based on the determined connection score, the display characteristics of the first UI elements 402 may be adjusted. For example, the adjustment may correspond to a change in a thickness (or a highlight) of an edge portion of the first UI elements 402 according to a value of the connection score. If a UI element of the first UI elements 402 is an avatar of a human character, then the adjustment of the display characteristics may correspond to addition of a highlighting effect on contour (or edge) of the avatar. In some instances, the circuitry 202 may be configured to determine whether the connection score (e.g., a percent value or a numeric value) is lesser than a threshold value. The threshold value may be a percent value (such as 60%, 70%, 75%, or any other percent value) between 0% and 100%) or a value (such as 0.6, 0.7, 0.75, or any other value) between 0 and 1.

In an embodiment, the circuitry 202 may be configured to receive a user input via the I/O device to set the threshold value. Without a user input, the connection score may be compared with a default threshold value. If the determined connection score is greater than the threshold value, then the connection score between the first user 114 and a user associated with the UI element may be determined to be high. Similarly, if the determined connection score is less than the threshold value, then the connection score between the first user 114 and a user associated with the UI element may be determined to be low.

Based on whether the connected score is determined to be high or low, the display characteristics of the UI element(s) may be adjusted, as described herein. For example, a UI element 402A is shown to bear a dark highlight effect on contour (or an edge portion) as the connection score between the first user 114 and a user associated with the UI element 402A is high. Similarly, a UI element 402B is shown to bear a standard/default highlight effect as the connection score between the first user 114 and a user associated with the UI element 402B is an average or standard connection score. A UI element 402C bears a light highlight effect as the connection score between the first user 114 and a user associated with the UI element 402C is low.

Figure 4C:
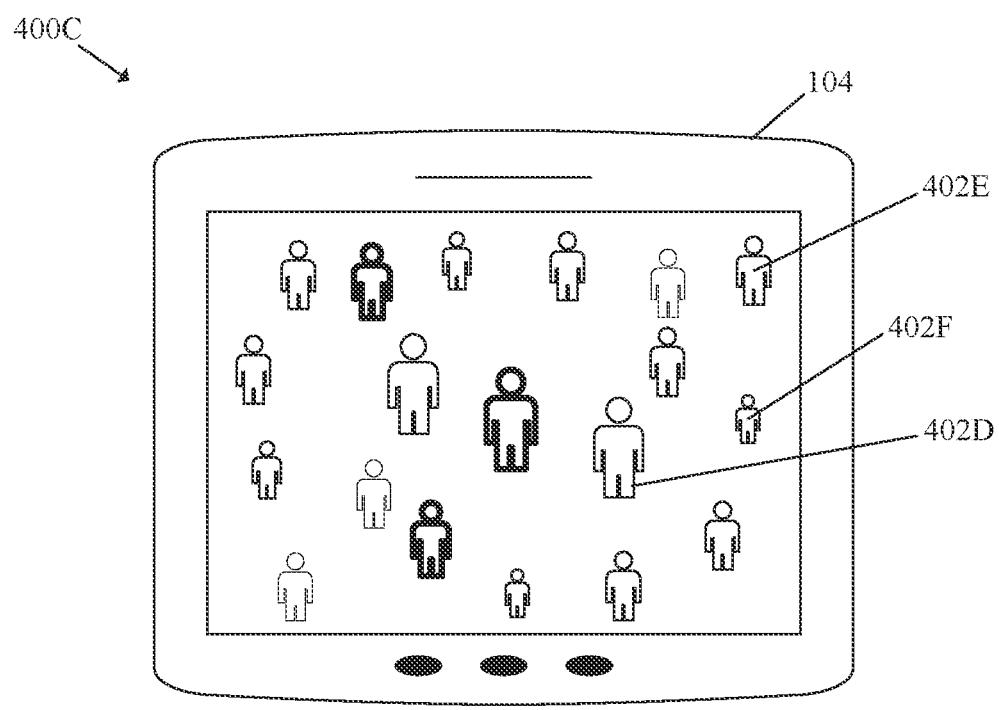

FIG. 4C is a diagram that illustrates an exemplary scenario to control display characteristics of a user interface (UI) element associated with each of one or more second users, in accordance with an embodiment of the disclosure. FIG. 4C is explained in conjunction with elements from FIGS. 1, 2, 3, 4A, and 4B. With reference to FIG. 4C, there is shown a diagram 400C of an exemplary scenario. In the scenario, there is shown the first electronic device 104 and the first UI elements 402 associated with respective second user. The one or more second users may be associated with the one or more social connections of the first user 114.

Based on the determined connection score, the display characteristics of the first UI elements 402 associated with each of the one or more second users may be adjusted. For example, the adjustment may correspond to a change in a size of the first UI elements 402 according to a value of the connection score. If the UI element of the first UI elements 402 is an avatar of a human character, then the adjustment of the display characteristics may correspond to a change in size of the avatar.

For example, a UI element 402D is shown to have a larger size as the connection score between the first user 114 and a user associated with the UI element 402D is high. Similarly, a UI element 402E is shown to have a standard/default size as the connection score between the first user 114 and a user associated with the UI element 402D is an average or standard connection score. A UI element 402F is shown to have a smaller size as the connection score between the first user 114 and a user associated with the UI element 402D is low.

In certain instances, a UI element may bear a dark highlight effect on contour (or an edge portion) and may appear large in size as the connection score is higher than that for the UI element 402D.

In some instances, the adjustment may correspond to a change in a display position of the first UI elements 402 according to a value of the determined connection score. For example, a UI element may be positioned towards a center of the display screen 110 as the connection score between the first user 114 and a user associated with the UI element may be high (based on a threshold). Similarly, a UI element may be positioned away from the center of the display screen 110 as the connection score between the first user 114 and a user associated with the UI element may be an average or standard connection score (based on a threshold). A UI element may be positioned towards end of the display screen 110 as the connection score between the first user 114 and a user associated with the UI element may be low (based on a threshold).

Figure 5:
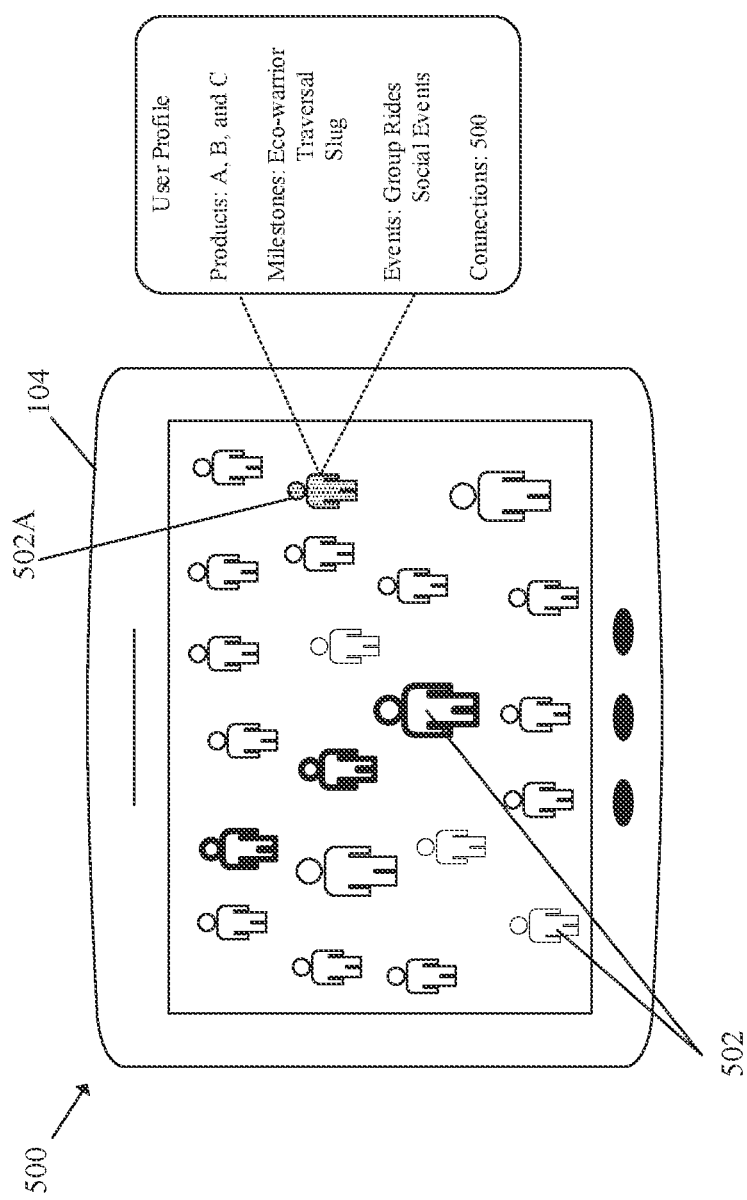
FIG. 5 is a diagram that illustrates an exemplary scenario to display user profile information related a second user, in accordance with an embodiment of the disclosure.

FIG. 5 is a diagram that illustrates an exemplary scenario to display user profile information related a second user, in accordance with an embodiment of the disclosure. FIG. 5 is explained in conjunction with elements from FIGS. 1, 2, 3, 4A, 4B, and 4C. With reference to FIG. 5, there is shown a diagram of an exemplary scenario 500. In the scenario 500, there is shown the first electronic device 104 and UI elements 502 associated with each of the one or more second users 116. Such users 116 may be associated with the one or more social connections of the first user 114.

The circuitry 202 may be configured to receive a user input indicative of selection of a first UI element 502A associated with a second user from the one or more second users 116. Upon selection, the first electronic device 104 may adjust the display characteristics of the first UI element 502A. The adjustment may correspond to a change in a background of the first UI element 502A. For example, the first UI element 502A is shown to have a background (represented by dotted pattern) substantially different from that of remaining UI elements of the UI elements 502.

Based on the received user input, the circuitry 202 may be configured to transmit user profile information to first electronic device 104. The user profile information may be related to the second user and may be associated with the selected first UI element 502A In some instances, the user profile information may be stored in the memory associated with the first electronic device 104 or on the server 102. The circuitry 202 may be configured to retrieve the user profile information from the memory or the server 102.

The transmitted user profile information may include, but not limited to, information about one or more products owned by the second user, one or more accessories associated with the one or more products, cost information associated with the one or more products, information about milestones achieved by the second user, one or more event preferences of the second user, or one or more social connections of the second user.

The one or more products owned by the second user may correspond to vehicles, consumer electronic devices, home improvement products or any other electronic goods purchased by the second user. For example, FIG. 5 shows products A, B, and C that may be owned by the second user. The vehicle may be an autonomous, a semi-autonomous, or a non-autonomous vehicle, as defined, for example, by Society of Automotive Engineers (SAE) automation levels. Other example implementations of the vehicle may include, but are not limited to, an electric vehicle, a hybrid vehicle, and/or a vehicle that uses a combination of one or more distinct renewable or non-renewable power sources.

The cost information associated with the one or more products may include all types of costs associated with ownership of the one or more products. For example, the second user may own a car and accessories such as a media player associated with the car. The cost information may include a cost of buying the car, a maintenance cost, an insurance cost, a cost of the media player, and a cost associated with installation of the media player. The information about milestones achieved by the second user may correspond to trophies or badges achieved by the second user while using the one or more products. For example, if the second user covers a distance of 300 miles using the car, then the second user may be rewarded with a badge for achieving a milestone of 300 miles. As another example, if the second user is found to be a daily user of an electric vehicle, then the second user may be awarded with a daily traveler badge and/or an eco-warrior badge for his/her contribution towards a reduced fossil fuel consumption. As another example, if the second user is found to drive the vehicle very slow for a particular distance, then the second user may be awarded a slug badge. The one or more event preferences of the second user may correspond to information associated with one or more events attended or organized by the second user over a period. As shown, for example, the one or more event preferences may include group rides and social events for the second user. An example of the event organized by the second user is described in FIG. 6B. The one or more social connections of the second user may include, for example, professional connections (for example, colleague), personal connections (for example, parents, children, spouse, friends, etc.), or any other connections (for example, trainer, delivery personal, etc.). As shown, for example, the second user may have 500 connections.

Figure 6A:
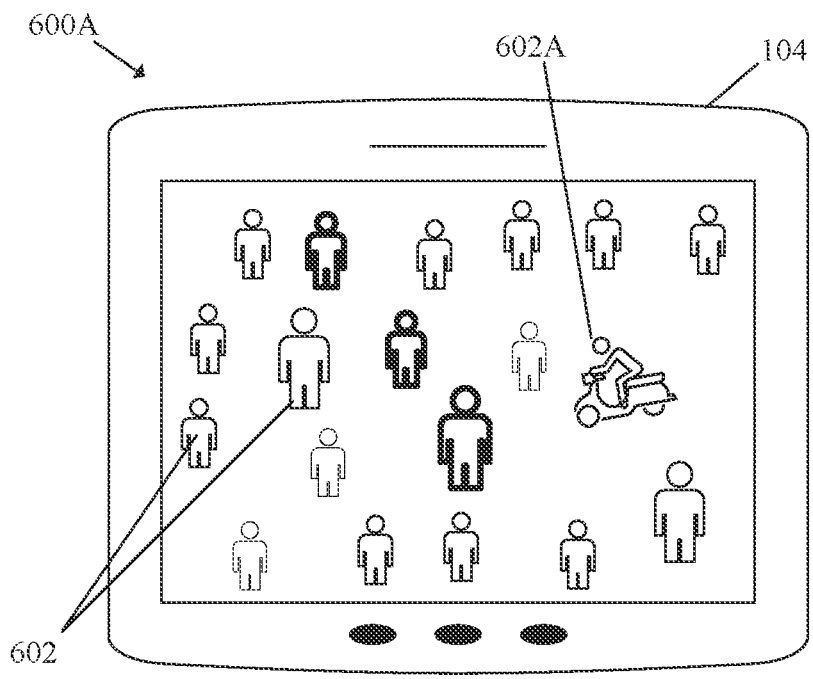
FIGS. 6A and 6B are diagrams that illustrate exemplary scenarios to update display information for one or more second users based on information corresponding to vehicles or products, in accordance with an embodiment of the disclosure.

FIG. 6A is a diagram that illustrates an exemplary scenario to update display information for one or more second users based on information corresponding to vehicles or products, in accordance with an embodiment of the disclosure. FIG. 6A is explained in conjunction with elements from FIGS. 1, 2, 3, 4A, 4B, 4C, and 5. With reference to FIG. 6A, there is shown a diagram 600A of an exemplary scenario. In the scenario, there is shown the first electronic device 104 and UI elements 602 associated with each of the one or more second users 116. The one or more second users 116 may be associated with the one or more social connections of the first user 114.

The circuitry 202 may be configured to monitor a set of parameters that indicate at least one of information corresponding to vehicles or products associated with each of the one or more second users 116 and one or more events organized or attended by each of the one or more second users. In an embodiment, the circuitry 202 may be configured to receive the set of parameters from one or more sensors associated with the one or more products owned by the second user. By way of example, and not limitation, the information corresponding to the vehicles or the products may include a state of the vehicles or products as one of an operational state or a rest state or a usage pattern of the second user of the vehicles or products. The one or more events organized or attended by each of the one or more second users may correspond to a group event or a social gathering organized or attended by the second user.

The circuitry 202 may be configured to update the display information for the one or more second users 116 based on the monitored set of parameters. For example, the display information may be updated to accommodate any variation in the set of parameters. The circuitry 202 may be configured to transmit the updated display information to the first electronic device 104. The first electronic device 104 may adjust the display characteristics of the UI elements 602. For example, the circuitry 202 may monitor the set of parameters to determine that a vehicle associated with the second user is in an operational state. For instance, the second user may be driving or riding the vehicle. In FIG. 6A, a UI element 602A depicts a user riding a vehicle.

If the second user is riding a four-wheeler vehicle (such as an electric car) and is awarded with an eco-warrior badge, then the display characteristics of the UI element associated with the second user may be adjusted to depict an animated form of the UI element. For example, the UI element associated with the second user may be an animation or an avatar (i.e., the UI element) in color, riding a four-wheeler vehicle.

Figure 6B:
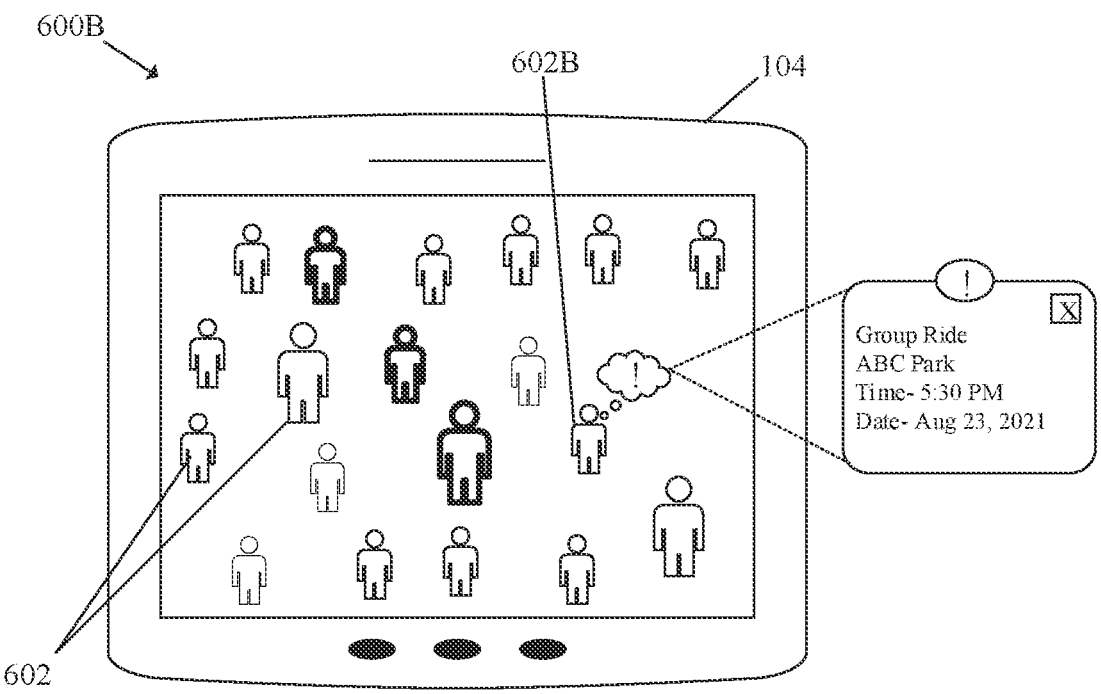

FIG. 6B is a diagram that illustrates an exemplary scenario to update display information for one or more second users based on one or more events, in accordance with an embodiment of the disclosure. FIG. 6B is explained in conjunction with elements from FIGS. 1, 2, 3, 4A, 4B, 4C, 5, and 6A. With reference to FIG. 6B, there is shown a diagram 600B of an exemplary scenario. In the scenario, there is shown the first electronic device 104 and the UI elements 602 associated with each of the one or more second users 116. The one or more second users 116 may be associated with the one or more social connections of the first user 114.

As shown, for example, a UI element 602B may include an exclamation mark (!) to depict an event organized by the second user. Upon selection of the UI element 602B, the circuitry 202 may be configured to transmit the updated display information (associated with the organized event) to the first electronic device 104, as described, for example, in FIG. 5. The first electronic device 104 may adjust the display characteristics of the UI element 602A. As shown, the event information is depicted as "Group ride towards ABC park at 5.30 pm on Aug. 23, 2021.

FIGS. 7A and 7B collectively illustrate an exemplary scenario to update display information for one or more second users based on information about an emotional state or a driving pattern, in accordance with an embodiment of the disclosure. FIGS. 7A, and 7B are explained in conjunction with elements from FIGS. 1, 2, 3, 4A, 4B, 4C, 5, 6A, and 6B. With reference to FIG. 7A, there is shown a diagram of an exemplary scenario 700A. In the scenario 700A, there is shown the first electronic device 104 and UI elements 702 associated with each of the one or more second users 116. The one or more second users 116 may be associated with the one or more social connections of the first user 114.

The circuitry 202 may be configured to acquire information associated with the first user 114 of the first electronic device 104, as described, for example, in FIG. 3. Based on the acquired information associated with the first user 114, the circuitry 202 may be configured to determine one or more social connections of the first user 114, as described for example, in FIG. 3. The one or more social connections may include the one or more second users 116 associated with respective electronic devices (such as the second electronic device 106).

The circuitry 202 may be configured to receive information from a second electronic device (such as the second electronic device 106) associated with each of the one or more second users 116. The received information may indicate an emotional state of each of the one or more second users 116 and a driving pattern (measured over a time period) of each of the one or more second users 116.

In some instances, the information may be received from the one or more sensors (not shown) associated with the second electronic device 106. The one or more sensors may include, for example, an image sensor or a touch sensor that may capture the emotional state of the second user. The image sensor may include suitable logic, circuitry, and interfaces that may be configured to capture an image or multiple images of each of the one or more second users 116 while using the vehicle or the product. Based on the captured images, the circuitry 202 may be configured to identify the emotional state of each of the one or more second users 116 and the driving pattern of each of the one or more second users 116. The image sensor may be used in imaging devices, such as a camera, a wide-angle camera, an action camera, a closed-circuit television (CCTV) camera, a camcorder, a digital camera, camera phones, a time-of-flight camera (ToF camera), a night-vision camera, and/or other image capture devices. The present disclosure may be also applicable to other types of sensors, a description of which has been omitted from the disclosure for the sake of brevity.

The emotional state may correspond to a current mood of each of the one or more second users 116 while using the vehicles or products. Examples of the emotional state may include, but are not limited to, a happy state, an angry state, a disgust state, a surprise state, an envy state, and a sad state. The driving pattern of each of the one or more second users 116 over a time period may correspond to a set of actions or observations related to a driver (such as the second user) of the vehicle. In an embodiment, an artificial intelligence (AI) model may be used to determine the driving pattern of the second user. The driving pattern of the second user may include, for example, a driver's adherence to speed limits at various locations, a speed of the vehicle, a driver's compliance with traffic regulations, a number of rash riding incidents, a number of times the second user lost a balance of the vehicle, and the like. In an embodiment, the vehicle may include one or more sensors (not shown) to determine the driving pattern of the second user. The one or more sensors may include at least one of a location sensor, a speed sensor, an inertial measurement unit (IMU), or an image sensor. Such sensors which may be configured to acquire datapoints that indicate the driving pattern of the second user.

The speed sensor may include suitable logic, circuitry, interfaces, and/or code that may estimate detect a current speed of the vehicle. The speed for different time-stamps may be recorded in a database stored in the memory 204. The image sensor may include suitable logic, circuitry, and interfaces that may be configured to capture an image or multiple images of surroundings or an ambient environment in of the vehicle. Based on the captured images and the speed for different time-stamps, the circuitry 202 may be configured to identify the driving pattern of the second user.

The circuitry 202 may be configured to update the display information for the one or more second users 116 based on the received information about the emotional state or the driving pattern. The circuitry 202 may be configured to transmit the updated display information to the first electronic device 104. The first electronic device 104 may receive the updated display information and may adjust the display characteristics of the UI elements 702 associated with the one or more second users 116.

For example, the emotional state or the driving pattern may be determined as angry or reckless, which may imply that the second user driving the vehicle may have a negative interaction with the first user 114. The first electronic device 104 may adjust display characteristics of the UI element 702A associated with the second UI element to depict such an emotional state or the driving pattern. For example, the adjustment may include a change in color of the UI element 702A to grey from a default color based on the received information from the second electronic device 106, in order to depict a negative mood of the second user.

With reference to FIG. 7B, there is shown a diagram of an exemplary scenario 700B. In the scenario 700B, there is shown the first electronic device 104 and UI elements 702 associated with each of the one or more second users 116. The one or more second users 116 may be associated with the one or more social connections of the first user 114.

The adjustment of the display characteristics may include removal of the UI elements associated with the one or more second users 116. For example, the UI element 702A may be removed from the display screen 110 so as to prevent any negative interaction between the first user 114 and a user associated with the UI element 702A.

In an embodiment, the circuitry 202 may be configured to determine a first navigation route and to update the first navigation route to include or exclude a route between a first geo-location of the first user 114 and a second geo-location of one or more second users 116 associated with the one or more social connections. In operational state, the circuitry 202 may be configured to determine the navigation route using the one or more sensors (such as a location sensor) associated with the first electronic device 104 or the second electronic device 106. In an embodiment, the location sensor (such as a Global Navigation Satellite System (GNSS) receiver or an inertial measurement unit (IMU)) may be integrated into the first electronic device 104 or the second electronic device 106. The circuitry 202 may update the determined first navigation route based on the determined connection score or on the information about the emotional state or the driving pattern and may transmit information about the updated first navigation route to the first electronic device 104.

In an embodiment, the connection score between the first user 114 and the second user may be determined to be high (i.e., above a threshold) and the first geo-location of the first user 114 may be determined as nearby to a second geo-location of the one or more second users 116 associated with the one or more social connections of the first user 114. Based on the determined first navigation route, it may be determined that a likelihood of interaction between the first user 114 and the second user is nominal or zero (i.e., below a threshold). In order to increase the likelihood of interaction, the first navigation route may be updated in a manner that the likelihood of interaction between the first user 114 and the second user is high (i.e., above a threshold). In one instance, the first navigation route may be updated to include a route between the first geo-location of the first user 114 and the second geo-location of the second user.

In another embodiment, the emotional state or the driving pattern may be determined as angry or reckless and the first geo-location of the first user 114 may be determined as nearby to a second geo-location of the one or more second users 116 associated with the one or more social connections of the first user 114. Based on the determined first navigation route, it may be determined that a likelihood of interaction between the first user 114 and the second user is high (i.e., above a threshold). In order to decrease the likelihood of interaction, the first navigation route may be updated in a manner that the likelihood of interaction between the first user 114 and the second user is low (i.e., below a threshold). In one instance, the first navigation route may be updated to exclude a route between the first geo-location of the first user 114 and the second geo-location of the second user.

Figure 8:
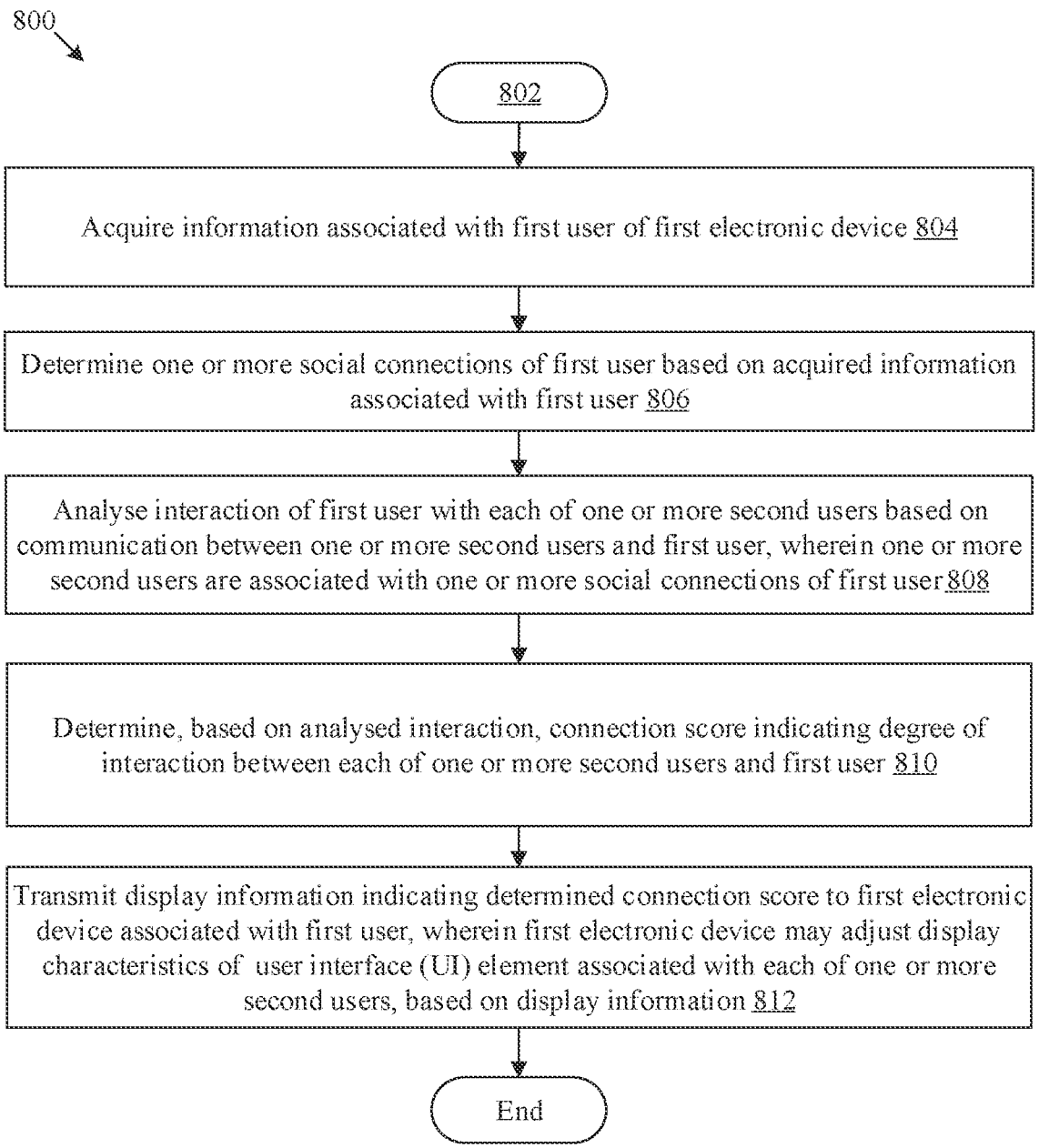
FIG. 8 is a flowchart that illustrates exemplary method for social interaction-based display control, in accordance with an embodiment of the disclosure.

FIG. 8 is a flowchart that illustrates exemplary method for social interaction-based display control, in accordance with an embodiment of the disclosure. FIG. 8 is explained in conjunction with elements from FIGS. 1, 2, 3, 4A, 4B, 4C, 5, 6A, 6B, 7A, and 7B. With reference to FIG. 8, there is shown a flowchart 800. The flowchart 800 may include operations from 802 to 812 and may be implemented by the server 102 of FIG. 1 or by the circuitry 202 of FIG. 2. The flowchart 800 may start at 802 and proceed to 804.

At 804, information associated with a first user of a first electronic device may be acquired. In an embodiment, the circuitry 202 may be configured to acquire the information associated with the first user (for example, the first user 114) of the first electronic device (for example, the first electronic device 104), as described, for example, in FIG. 3.

At 806, one or more social connections of the first user 114 may be determined, based on the acquired information associated with the first user. In an embodiment, the circuitry 202 may be configured to determine the one or more social connections of the first user 114 based on the acquired information associated with the first user 114, as described for example, in FIG. 3.

At 808, an interaction of the first user 114 with each of one or more second users may be analyzed, based on communication between the one or more second users and the first user. In an embodiment, the circuitry 202 may be configured to analyze the interaction of the first user 114 with each of the one or more second users (for example, the one or more second users 116) based on a communication between the one or more second users 116 and the first user 114. The one or more second users 116 may associated with the one or more social connections of the first user. The analysis of the interaction is described for example, in FIG. 3.

At 810, a connection score associated with each of the one or more second users and the first user 114 may be determined, based on analyzed interaction. In an embodiment, the circuitry 202 may be configured to determine, based on the analyzed interaction, the connection score indicating a degree of interaction between each of the one or more second users 116 and the first user 114. The determination of the connection score is described for example, in FIG. 3.

At 812, the display information indicating the determined connection score may be transmitted to the first electronic device associated with the first user. In an embodiment, the circuitry 202 may be configured to transmit display information indicating the determined connection score to the first electronic device 104 associated with the first user 114. The first electronic device 104 may adjust one or more display characteristics of a user interface (UI) element associated with each of the one or more second users 116 based on the display information. The transmission of the display information is described for example, in FIG. 3. Control may pass to end.

Although the flowchart 800 is illustrated as discrete operations, such as 804, 806, 808, 810, and 812 the disclosure is not so limited. Accordingly, in certain embodiments, such discrete operations may be further divided into additional operations, combined into fewer operations, or eliminated, depending on the particular implementation without detracting from the essence of the disclosed embodiments.

Figure 9:
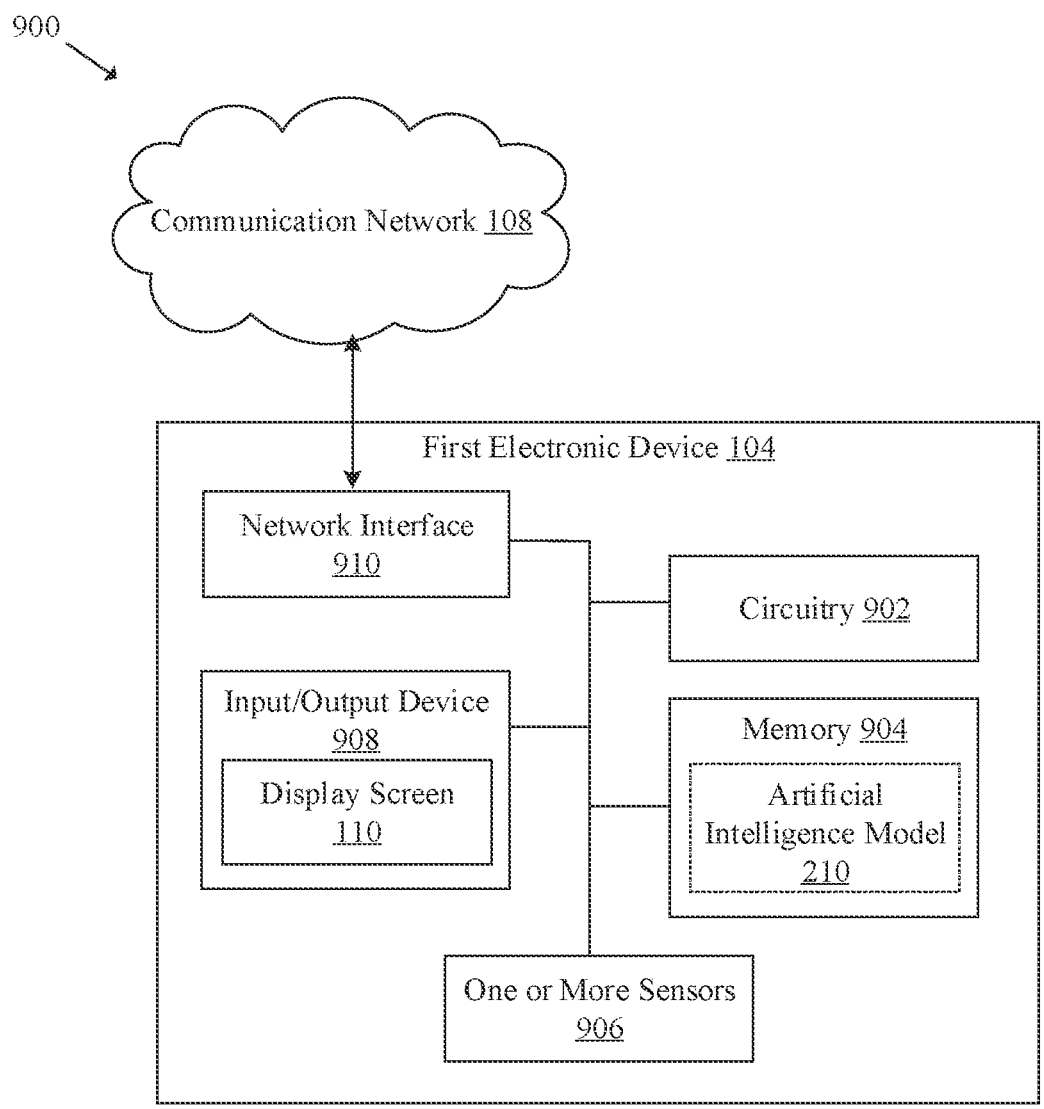
FIG. 9 is a block diagram that illustrates an exemplary first electronic device of FIG. 1, in accordance with an embodiment of the disclosure.

FIG. 9 is a block diagram that illustrates an exemplary first electronic device of FIG. 1, in accordance with an embodiment of the disclosure. FIG. 9 is explained in conjunction with elements from FIGS. 1, 2, 3, 4A, 4B, 4C, 5, 6A, 6B, 7A, 7B, and 8. With reference to FIG. 9, there is shown a block diagram 900 of the first electronic device 104. The first electronic device 104 may include circuitry 902, a memory 904, one or more sensors 906, an Input/Output (I/O) device 908, and a network interface 910. The I/O device 908 may further include the display screen 110. The memory 904 may include the AI model 210. The network interface 910 may connect the first electronic device 104 with the server 102, via the communication network 108.

The circuitry 902 may include suitable logic, circuitry, interfaces, and/or code that may be configured to execute program instructions associated with different operations to be executed by the first electronic device 104. The circuitry 902 may include any suitable special-purpose or general-purpose computer, computing entity, or processing device including various computer hardware or software modules and may be configured to execute instructions stored on any applicable computer-readable storage media. For example, the circuitry 902 may include a microprocessor, a microcontroller, a DSP, an ASIC, a FPGA, or any other digital or analog circuitry configured to interpret and/or to execute program instructions and/or to process data. The functions of the circuitry 902 may be same as the functions of the circuitry 202 described, for example, in FIG. 2. Therefore, further description of the circuitry 902 is omitted from the disclosure for the sake of brevity.

The memory 904 may include suitable logic, circuitry, interfaces, and/or code that may be configured to store the program instructions executable by the circuitry 902. In certain embodiments, the memory 904 may be configured to store operating systems and associated application-specific information. In at least one embodiment, the memory 904 may be configured to store the AI model 210. The functions of the memory 904 may be same as the functions of the memory 204 described, for example, in FIG. 2. Therefore, further description of the memory 904 is omitted from the disclosure for the sake of brevity.

The one or more sensors 906 associated with the first electronic device 104 may include suitable logic, circuitry, code, and/or interfaces that may be configured to capture the communication between each of the one or more second users 116 and the first user 114. The one or more sensors 906 may be configured to determine an emotional state of the first user 114 during the communication. Examples of the one or more sensors 906 may include, but are not limited to, an image sensor, a proximity sensor, an accelerometer, a gyroscope, a location sensor, a temperature sensor, a touch sensor, and an infrared sensor. The one or more sensors 906 may be included in or integrated into the first electronic device 104.

The I/O device 908 may include suitable logic, circuitry, interfaces, and/or code that may be configured to receive an input and provide an output based on the received input. The I/O device 908 may include various input and output devices, which may be configured to communicate with the circuitry 902. The functions of the I/O device 908 may be same as the functions of the I/O device 206 described, for example, in FIG. 2. Therefore, further description of the I/O device 908 is omitted from the disclosure for the sake of brevity.

The network interface 910 may include suitable logic, circuitry, interfaces, and/or code that may enable communication between the first electronic device 104 and the server 102, via the communication network 108. The network interface 910 may implement known technologies to support wired and/or wireless communication. The network interface 910 may include, but is not limited to, an antenna, a frequency modulation (FM) transceiver, a radio frequency (RF) transceiver, one or more amplifiers, a tuner, one or more oscillators, a digital signal processor, a coder-decoder (CODEC) chipset, a subscriber identity module (SIM) card, and/or a local buffer. The functions of the network interface 910 may be same as the functions of the network interface 208 described, for example, in FIG. 2. Therefore, further description of the network interface 910 is omitted from the disclosure for the sake of brevity.

It should be noted that some or all of the functions and/or operations performed by the circuitry 202 (as described in FIG. 2) may be performed by the circuitry 902, without a deviation from the scope of the disclosure.

Figure 10:
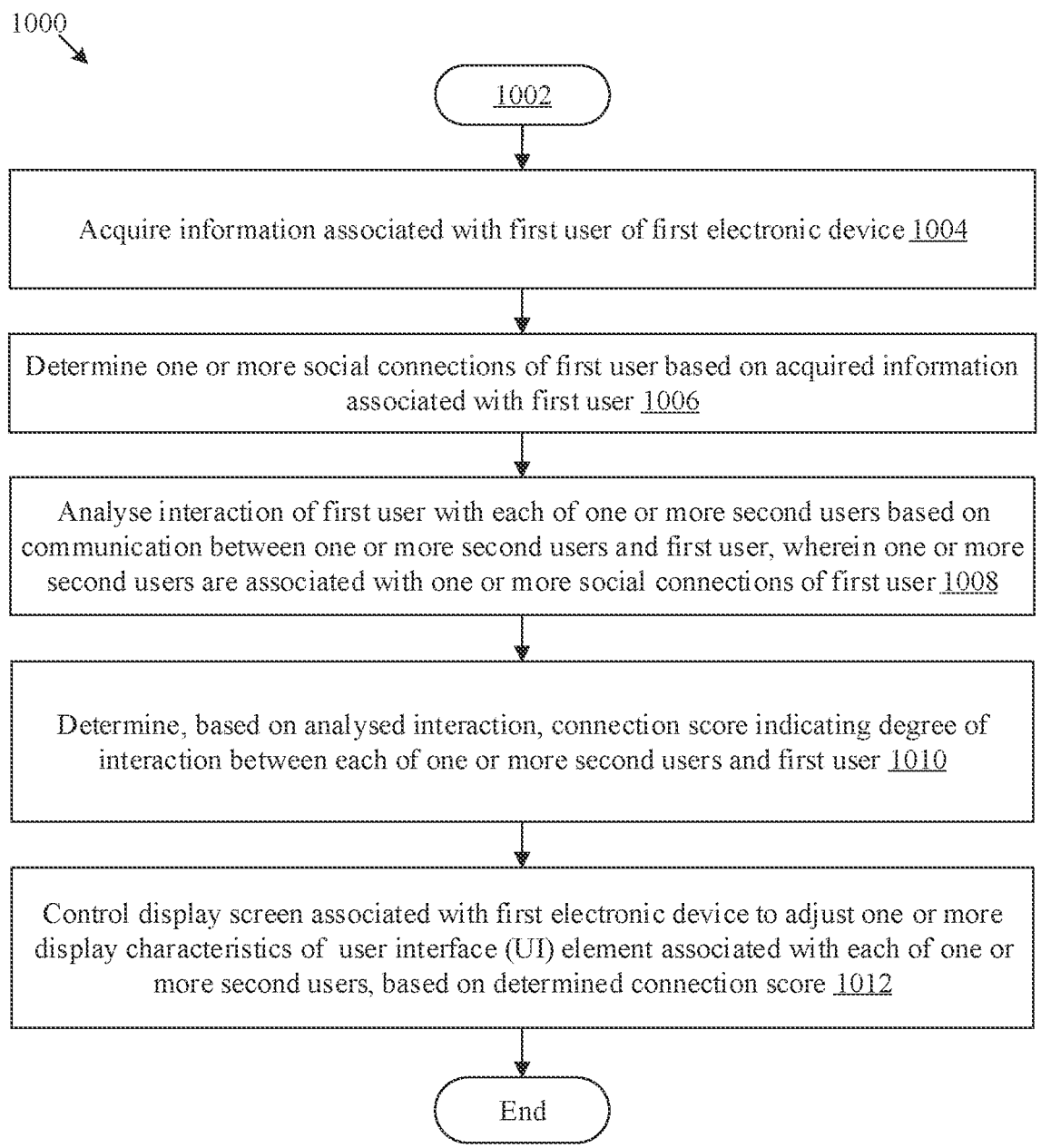
FIG. 10 is a flowchart that illustrates exemplary method for social interaction-based display control on a first electronic device, in accordance with an embodiment of the disclosure.

FIG. 10 is a flowchart that illustrates exemplary method for social interaction-based display control on a first electronic device, in accordance with an embodiment of the disclosure. FIG. 10 is explained in conjunction with elements from FIGS. 1, 2, 3, 4A, 4B, 4C, 5, 6A, 6B, 7A, 7B, 8, and 9. With reference to FIG. 10, there is shown a flowchart 1000. The flowchart 1000 may include operations from 1002 to 1012 and may be implemented by the first electronic device 104 of FIG. 1 or the circuitry 902 of FIG. 9. The flowchart 1000 may start at 1002 and proceed to 1004.

At 1004, information associated with a first user of a first electronic device may be acquired. In an embodiment, the circuitry 202 may be configured to acquire the information associated with the first user (for example, the first user 114) of the first electronic device (for example, the first electronic device 104), as described, for example, in FIG. 3.

At 1006, one or more social connections of the first user 114 may be determined, based on the acquired information associated with the first user. In an embodiment, the circuitry 202 may be configured to determine the one or more social connections of the first user 114 based on the acquired information associated with the first user 114, as described for example, in FIG. 3.

At 1008, an interaction of the first user 114 with each of one or more second users may be analyzed, based on communication between the one or more second users and the first user. In an embodiment, the circuitry 202 may be configured to analyze the interaction of the first user 114 with each of the one or more second users (for example, the one or more second users 116) based on a communication between the one or more second users 116 and the first user 114. The one or more second users 116 may associated with the one or more social connections of the first user. The analysis of the interaction is described for example, in FIG. 3.

At 1010, a connection score associated with each of the one or more second users and the first user 114 may be determined, based on analyzed interaction. In an embodiment, the circuitry 202 may be configured to determine, based on the analyzed interaction, the connection score indicating a degree of interaction between each of the one or more second users 116 and the first user 114. The determination of the connection score is described for example, in FIG. 3.

At 1012, a display screen associated with the first electronic device may be controlled. In one or more embodiments, the circuitry 202 may be configured to control the display screen (for example, the display screen 110) associated with the first electronic device 104 to adjust one or more display characteristics of a user interface (UI) element associated with each of the one or more second users 116 based on the determined connection score. The control of the display screen 110 is described for example, in FIGS. 4A, 4B, 4C, 5, 6A, and 6B. Control may pass to end.

Although the flowchart 1000 is illustrated as discrete operations, such as 1004, 1006, 1008, 1010, and 1012 the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a first electronic device (such as the first electronic device 104 of FIG. 1) that includes circuitry 1002. The circuitry 1002 may acquire information associated with a first user 114 of the first electronic device 104. The circuitry 1002 may determine one or more social connections of the first user 114 based on the acquired information associated with the first user 114. The circuitry 1002 may analyze an interaction of the first user 114 with each of one or more second users 116 based on a communication between the one or more second users 116 and the first user 114. The one or more second users 116 may be associated with the one or more social connections of the first user 114. The circuitry 1002 may determine, based on the analyzed interaction, a connection score indicating a degree of interaction between each of the one or more second users 116 and the first user 114. The circuitry 1002 may control a display screen 110 associated with the first electronic device 104 to adjust one or more display characteristics of a user interface (UI) element associated with each of the one or more second users 116 based on the determined connection score.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made, and equivalents may be substituted without departing from the scope of the present disclosure. In addition, many modifications may be made to adapt a particular situation or material to the teachings of the present disclosure without departing from its scope. Therefore, it is intended that the present disclosure is not limited to the particular embodiment disclosed, but that the present disclosure will include all embodiments that fall within the scope of the appended claims.

What is claimed is:

1. A server, comprising:
   circuitry configured to:
     acquire information associated with a first user of a first electronic device;
     determine one or more social connections of the first user based on the acquired information associated with the first user;

analyze interactions of the first user with each of one or more second users based on communication between the one or more second users and the first user, wherein the one or more second users are associated with the one or more social connections of the first user;

determine, based on the analyzed interactions, a connection score for each of the one or more second users indicating a degree of interaction between each of the one or more second users and the first user; and transmit display information indicating each of the determined connection score for each of the one or more second users to the first electronic device associated with the first user, wherein based on the display information indicating each of the determined connection score for each of the one or more second users, the first electronic device adjusts one or more display characteristics of a user interface (UI) element associated with each of the one or more second users.

2. The server according to claim 1, wherein each of the one or more second users are associated with a geographical region and the circuitry is further configured to:

receive information associated with the geographical region from the first electronic device; and determine the one or more social connections of the first user based on the received information associated with the geographical region.

3. The server according to claim 1, wherein the adjusted one or more display characteristics of the UI element for each of the one or more second users comprises at least one of: a size, a color, a highlighting, an animation, an image, a background, or a display position.

4. The server according to claim 1, wherein the communication between the one or more second users and the first user comprises at least one of: one or more messages shared, a frequency of the one or more messages, one or more media content shared, a number of the one or more messages, or a number of likes or dislikes for the one or more messages.

5. The server according to claim 1, wherein the circuitry is further configured to:

receive a user input indicative of selection of a first UI element associated with a second user from the one or more second users; and transmit user profile information which is related the second user and is associated with the selected first UI element, based on the received user input.

6. The server according to claim 5, wherein the transmitted user profile information comprises at least one of: information about one or more products owned by the second user, one or more accessories associated with the one or more products, cost information associated with the one or more products, information about milestones achieved by the second user, one or more event preferences of the second user, or one or more social connections of the second user.

7. The server according to claim 1, further comprising a memory configured to store an Artificial Intelligence (AI) model, wherein the circuitry is further configured to determine the connection score based on application of the stored AI model on the communication between the first user and each of the one or more second users.

8. The server according to claim 1, wherein the circuitry is further configured to:

monitor a set of parameters that indicates at least one of:

information corresponding to vehicles or products associated with each of the one or more second users, and one or more events organized or attended by each of the one or more second users;

update the display information for the one or more second users based on the monitored set of parameters; and transmit the updated display information to control the adjusted one or more display characteristics of the user interface (UI) elements for the one or more second users.

9. The server according to claim 1, wherein the circuitry is further configured to:

determine a first navigation route between a first geo-location of the first user and a second geo-location of each of the one or more second users associated with the one or more social connections;

update the determined first navigation route based on the determined connection score; and transmit information about the updated first navigation route to the first electronic device.

10. The server according to claim 1, wherein the circuitry is further configured to:

receive information from a second electronic device associated with each of the one or more second users, wherein the received information indicates at least one of: an emotional state of each of the one or more second users, and a driving pattern of each of the one or more second users over a time period;

update the display information for the one or more second users based on the received information about the emotional state or the driving pattern; and transmit the updated display information to control the adjusted one or more display characteristics of the user interface (UI) elements for the one or more second users.

11. The server according to claim 1, wherein the circuitry is further configured to:

receive information associated with an interaction between the first user and one or more third users different from the one or more second users;

analyze the received information associated with the interaction between the first user and the one or more third users; and update the one or more social connections of the first user based on the analyzed information.

12. A first electronic device, comprising:

circuitry configured to:

acquire information associated with a first user of the first electronic device;

determine one or more social connections of the first user based on the acquired information associated with the first user;

analyze interactions of the first user with each of one or more second users based on communication between the one or more second users and the first user, wherein the one or more second users are associated with the one or more social connections of the first user;

determine, based on the analyzed interactions, a connection score for each of the one or more second users indicating a degree of interaction between each of the one or more second users and the first user; and control a display screen associated with the first electronic device to adjust one or more display characteristics of a user interface (UI) element associated with each of the one or more second users based on each of the determined connection scores.

13. The first electronic device according to claim 12, further comprising one or more sensors, wherein the circuitry is further configured to control the one or more sensors to capture the communication between each of the one or more second users and the first user and an emotional state of the first user during the communication.

14. The first electronic device according to claim 12, wherein each of the one or more second users are associated with a geographical region and the circuitry is further configured to:
   receive a user input indicating the geographical region; and
   determine the one or more social connections of the first user based on the received user input.

15. The first electronic device according to claim 12, wherein the adjusted one or more display characteristics of the UI element for each of the one or more second users comprises at least one of: a size, a color, a highlighting, an animation, an image, a background, or a display position.

16. The first electronic device according to claim 12, wherein the communication between the one or more second users and the first user comprises at least one of: one or more messages shared, a frequency of the one or more messages, one or more media content shared, a number of the one or more messages, or a number of likes or dislikes for the one or more messages.

17. The first electronic device according to claim 12, wherein the circuitry is further configured to:
   receive a user input indicative of selection of a first UI element associated with a second user from the one or more second users; and
   determine user profile information which is related the second user and is associated with the selected first UI element, based on the received user input.

18. The first electronic device according to claim 17, wherein the determined user profile information comprises at least one of: information about one or more products owned by the second user, one or more accessories associated with the one or more products, cost information associated with the one or more products, information about milestones achieved by the second user, one or more event preferences of the second user, or one or more social connections of the second user.

19. The first electronic device according to claim 12, further comprising a memory configured to store an Artificial Intelligence (AI) model, wherein the circuitry is further configured to determine the connection score based on application of the stored AI model on the communication between the first user and each of the one or more second users.

20. A method, comprising:
   in a server:
      acquiring information associated with a first user of a first electronic device;
      determining one or more social connections of the first user based on the acquired information associated with the first user;
      analyzing interactions of the first user with each of one or more second users based on communication between the one or more second users and the first user, wherein the one or more second users are associated with the one or more social connections of the first user;
      determining, based on the analyzed interactions, a connection score for each of the one or more second users indicating a degree of interaction between each of the one or more second users and the first user; and
      transmitting display information indicating each of the determined connection score for each of the one or more second users to the first electronic device associated with the first user, wherein based on the display information indicating each of the determined connection score for each of the one or more second users, the first electronic device adjusts one or more display characteristics of a user interface (UI) element associated with each of the one or more second users.

* * * * *